(12) United States Patent
Chen et al.

(10) Patent No.: US 9,261,676 B2
(45) Date of Patent: Feb. 16, 2016

(54) OPTICAL IMAGE CAPTURING LENS SYSTEM

(71) Applicant: LARGAN PRECISION CO., LTD., Taichung (TW)

(72) Inventors: Kuan-Ming Chen, Taichung (TW); Tsung-Han Tsai, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/573,960

(22) Filed: Dec. 17, 2014

(65) Prior Publication Data

US 2015/0103415 A1 Apr. 16, 2015

Related U.S. Application Data

(62) Division of application No. 13/785,453, filed on Mar. 5, 2013, now Pat. No. 8,922,909.

(30) Foreign Application Priority Data

Nov. 21, 2012 (TW) .............................. 101143390 A

(51) Int. Cl.
*G02B 3/02* (2006.01)
*G02B 13/18* (2006.01)
*G02B 9/60* (2006.01)
*G02B 13/00* (2006.01)

(52) U.S. Cl.
CPC .............. *G02B 13/0045* (2013.01); *G02B 9/60* (2013.01)

(58) Field of Classification Search
CPC .............................. G02B 9/60; G02B 13/0045
USPC .......................................... 359/714, 764, 766
See application file for complete search history.

(56) References Cited

U.S. PATENT DOCUMENTS

2014/0126073 A1* 5/2014 Tsai ................... G02B 13/0045
359/764

* cited by examiner

*Primary Examiner* — William Choi
(74) *Attorney, Agent, or Firm* — Locke Lord LLP; Tim Tingkang Xia, Esq.

(57) ABSTRACT

This disclosure provides an optical image capturing lens system comprising: a positive first lens element having a convex object-side surface, a negative second lens element, a positive third lens element having a convex image-side surface, a fourth lens element having a concave object-side surface and a convex image-side surface; and a positive fifth lens element having a convex object-side surface at a paraxial region thereof, both of the object-side and image-side surfaces being aspheric, and at least one inflection point is positioned on at least one of the object-side and image-side surfaces thereof. When particular relations are satisfied, the angle at which light projects onto the image plane can be efficiently controlled for increasing the relative illumination and preventing the occurrence of vignetting.

13 Claims, 21 Drawing Sheets

OPTICAL IMAGE CAPTURING LENS SYSTEM

CROSS REFERENCE TO RELATED APPLICATIONS

This application is a Divisional Application of U.S. application Ser. No. 13/785,453 filed on Mar. 5, 2013, which claims priority under 35 U.S.C. 119(e) to Taiwan Application Serial No. 101143390 filed on Nov. 21, 2012, the entire contents of which are incorporated by reference herein.

BACKGROUND

1. Field of the Disclosure

The present disclosure relates to an optical image capturing lens system, and more particularly, to a compact optical image capturing lens system used in electronic products.

2. Description of the Related Art

The demand for compact imaging lens assembly has grown in recent years as the popularity of portable electronic products with the photographing function has increased. The sensor of a general photographing camera is none other than CCD (Charge Coupled Device) or CMOS (Complementary Metal Oxide Semiconductor) sensor. Furthermore, as the advanced semiconductor manufacturing technology has allowed the pixel size of sensors to be reduced, and the current electronic products are leaning toward a trend of being more compact, there is an increasing demand for higher image quality.

A conventional compact imaging lens system with high image quality equipped on a portable electronic product is often composed of four lens elements such as the lens system set forth in U.S. Pat. No. 8,179,470. However, with the popularity of high level portable electronic products, such as smart phone and PDA (Personal Digital Assistant), the demand for the pixel size and image quality of compact imaging lens system increase fast, and the conventional lens system with four lens elements can no longer satisfy the imaging lens systems of even higher level. Although lens systems adopting five lens elements begin to emerge recently, such as the lens system set forth in U.S. Pat. No. 8,000,030, the lens system struggles in handling the off-axis incident-light so that it tends to have a vignetting effect in the formed image and the relative illumination of the lens system is so low that the image quality becomes undesirable.

In light of the foregoing, an optical image capturing lens system that is suitable for portable electronic devices and has excellent image quality is in need; especially for those whose fifth lens element is configured with stronger positive reflective power, which is favorable for positioning the principle point away toward the image plane. Thus, the angle of incidence from the off-axis field can be effectively controlled for improving relative illumination of peripheral Image and preventing the occurrence of vignetting, which are favorable for improving image quality.

SUMMARY

The present disclosure provides an optical image capturing lens system, in order from an object side to an image side comprising five lens elements with refractive power: a first lens element with positive refractive power having a convex object-side surface; a second lens element with negative refractive power; a third lens element with positive refractive power having a convex image-side surface; a fourth lens element with refractive power having a concave object-side surface and a convex image-side surface; and a fifth lens element with positive refractive power having a convex object-side surface at a paraxial region, both of the object-side and image-side surfaces being aspheric, and at least one inflection point is formed on at least one of the object-side surface and the image-side surface thereof; wherein the lens elements with refractive power in the optical image capturing lens system are the first lens element, the second lens element, the third lens element, the fourth lens element, and the fifth lens element; wherein a focal length of the optical image capturing lens system is f, a focal length of the fifth lens element is f5, a curvature radius of the object-side surface of the fifth lens element is R9, a curvature radius of the object-side surface of the first lens element is R1, a curvature radius of the object-side surface of the third lens element is R5, a curvature radius of the image-side surface of the third lens element is R6, and they satisfy the following relations: $0.55 < f/f5 < 2.0$; $0 < R9/R1 < 1.7$; and $0.2 < (R5+R6)/(R5-R6) < 2.5$.

On the other hand, the present disclosure provides an optical image capturing lens system, in order from an object side to an image side comprising five lens elements with refractive power: a first lens element with positive refractive power having a convex object-side surface; a second lens element with negative refractive power; a third lens element with positive refractive power having a convex image-side surface; a fourth lens element with negative refractive power having a concave object-side surface and a convex image-side surface, and both of the object-side and image-side surfaces being aspheric; and a fifth lens element with positive refractive power having a convex object-side surface at a paraxial region and a concave image-side surface at a paraxial region, both of the object-side and image-side surfaces being aspheric, and at least one inflection point is formed on at least one of the object-side surface and the image-side surface thereof; wherein the lens elements with refractive power in the optical image capturing lens system are the first lens element, the second lens element, the third lens element, the fourth lens element, and the fifth lens element; wherein a focal length of the optical image capturing lens system is f, a focal length of the fifth lens element is f5, a curvature radius of the object-side surface of the third lens element is R5, a curvature radius of the image-side surface of the third lens element is R6, and they satisfy the following relations: $0.55 < f/f5 < 2.0$; and $0.2 < (R5+R6)/(R5-R6) < 2.5$.

Furthermore, the present disclosure provides an optical image capturing lens system, in order from an object side to an image side comprising five lens elements with refractive power: a first lens element with positive refractive power having a convex object-side surface; a second lens element with negative refractive power; a third lens element with refractive power; a fourth lens element with negative refractive power having a concave object-side surface and a convex image-side surface, and both of the object-side and image-side surfaces being aspheric; and a fifth lens element with positive refractive power having a convex object-side surface at a paraxial region, both of the object-side and image-side surfaces being aspheric, and at least one inflection point is formed on at least one of the object-side surface and the image-side surface thereof; wherein the lens elements with refractive power in the optical image capturing lens system are the first lens element, the second lens element, the third lens element, the fourth lens element, and the fifth lens element; wherein a focal length of the optical image capturing lens system is f, a focal length of the fifth lens element is f5, a curvature radius of the object-side surface of the fifth lens element is R9, a curvature radius of the object-side surface of the first lens element is R1, an Abbe number of the fourth lens element is V4, an Abbe number of the fifth lens element is V5, and they satisfy the following relations: $0.55 < f/f5 < 2.0$; $0 < R9/R1 < 1.7$; and $0.2 < V4/V5 < 0.6$.

DETAILED DESCRIPTION OF THE PREFERRED EMBODIMENTS

Figure 1A:
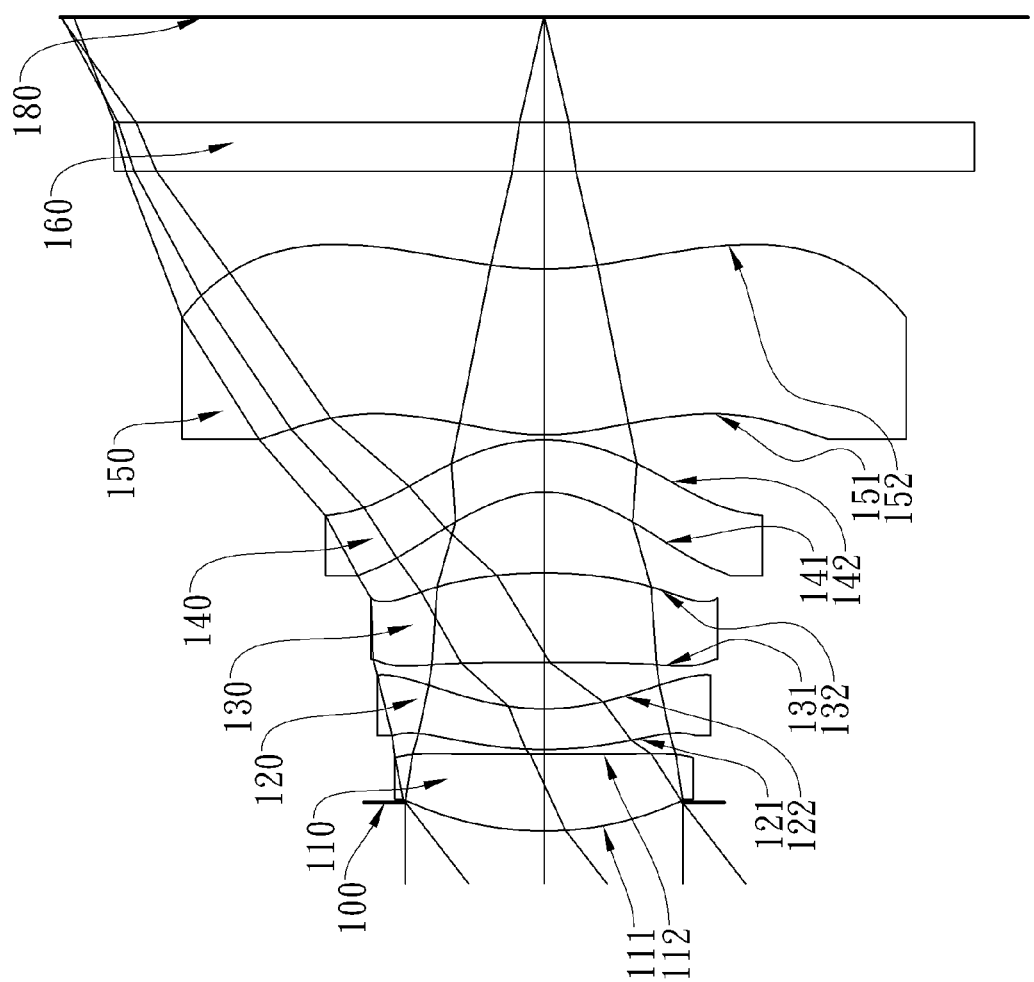
FIG. 1A shows an optical image capturing lens system in accordance with the first embodiment of the present disclosure.

The present disclosure provides an optical image capturing lens system, which comprises, in order from the object-side to the image-side, a first lens element, a second lens element, a third lens element, a fourth lens element and a fifth lens element.

The first lens element has positive refractive power, which provides the main refractive power of the system, and thereby the total track length of the system is reduced. When the first lens element has a convex object-side surface, the distribution of the positive refractive power thereof can be adjusted for reducing the total optical track length of the system.

The second lens element has negative refractive power, which is favorable for correcting the aberration produced by the first lens element. When the second lens element has a convex object-side surface and a concave image-side surface, it is favorable for correcting the astigmatism of the system and improving image quality.

The third lens element has positive refractive power, which can reduce the sensitivity of the system. When the third lens element has a convex image-side surface, the spherical aberration can be corrected.

The fourth lens element has a negative refractive power, which can correct the aberration of the system. When the fourth lens element has a concave object-side surface and a convex image-side surface, the astigmatism can be corrected.

When the fifth lens element has positive refractive power, the principle point can be positioned away toward the image plane for effectively controlling the angle of incidence from the off-axis field. Thus, the relative illumination of peripheral Image can be increased and the occurrence of vignetting can be prevented. When the fifth lens element has a convex object-side surface and a concave image-side surface, the astigmatism can be favorably corrected. When at least one inflection point is formed on at least one of the object-side surface and the image-side surface thereof, the angle of incidence onto the image sensor from the off-axis field can be effectively reduced so that the sensing efficiency of the image sensor can be improved and the off-axis aberration can be corrected.

A focal length of the optical image capturing lens system is f. A focal length of the fifth lens element is f5. When the relation of $0.55 < f/f5 < 2.0$ is satisfied, by configuring stronger positive refractive power for the fifth lens element, the principle point can be positioned away toward the image plane for effectively controlling the angle of incidence from the off-axis field. Thus, the relative illumination of peripheral Image can be increased and the occurrence of vignetting can be prevented; preferably, the following relation is satisfied: $0.75 < f/f5 < 1.8$.

A curvature radius of the object-side surface of the fifth lens element is R9. A curvature radius of the object-side surface of the first lens element is R1. When the relation of $0 < R9/R1 < 1.7$ is satisfied, the distribution of the positive refractive power can be balanced for reducing the sensitivity of the system; preferably, the following relation is satisfied: $0.2 < R9/R1 < 1.3$.

A curvature radius of the object-side surface of the third lens element is R5. A curvature radius of the image-side surface of the third lens element is R6. When the relation of $0.2 < (R5+R6)/(R5-R6) < 2.5$ is satisfied, the spherical aberration can be reduced and the astigmatism can be reduced for improving image quality.

An Abbe number of the fourth lens element is V4. An Abbe number of the fifth lens element is V5. When the relation of $0.2 < V4/V5 < 0.6$ is satisfied, the chromatic aberration of the system can be effectively corrected.

An axial distance between the fourth lens element and the fifth lens element is T45. An axial distance between the third lens element and the fourth lens element is T34. When the relation of $0 < T45/T34 < 0.35$ is satisfied, the interval distances between lens elements are proper for the assembly of the lens system and the manufacture yield rate thereof can be improved.

A central thickness of the second lens element is CT2. A central thickness of the fourth lens element is CT4. An axial distance between the second lens element and the third lens element is T23. An axial distance between the third lens element and the fourth lens element is T34. When the relation of $0.5<(CT2+CT4)/(T23+T34)<0.9$ is satisfied, the manufacture yield rate can be improved.

A focal length of the fourth lens element is f4. A focal length of the second lens element is f2. When the relation of $0.1<f4/f2<0.85$ is satisfied, the aberration can be favorably corrected.

A curvature radius of the object-side surface of the second lens element is R3. A curvature radius of the image-side surface of the second lens element is R4. When the relation of $0.05<(R3-R4)/(R3+R4)<0.5$ is satisfied, the astigmatism can be reduced and the aberration can be corrected for improving resolution.

A vertical distance with respect to an optical axis between a critical point on the object-side surface of the fifth lens element and the optical axis is Yc51; wherein the critical point is not on the axis. A focal length of the optical image capturing lens system is f. When the relation of $0.1<Yc51/f<0.7$ is satisfied, it is favorable for reducing the angle of incidence onto the image sensor from the off-axis field and further correcting the aberration of off-axis field.

A curvature radius of the object-side surface of the fourth lens element is R7. A curvature radius of the image-side surface of the fourth lens element is R8. When the relation of $-0.5<(R7-R8)/(R7+R8)<-0.1$ is satisfied, the astigmatism can be effectively corrected.

An axial distance between the first lens element and the second lens element is T12. An axial distance between the second lens element and the third lens element is T23. When the relation of $0.02<T12/T23<0.4$ is satisfied, it is favorable for lens elements assembly and improving manufacture yield rate.

A central thickness of the fourth lens element is CT4. A central thickness of the fifth lens element is CT5. When the relation of $0.1<CT4/CT5<0.40$ is satisfied, it is favorable for the molding and manufacture of lens elements, which is also favorable for obtaining good image quality.

In the aforementioned optical image capturing lens system, the lens elements can be made of glass or plastic materials. If the lens elements are made of glass, the freedom for distributing the refractive power of the optical image capturing lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the optical image capturing lens system can be effectively reduced.

In the present optical image capturing lens system, there can be at least one stop provided, such as an aperture stop, a glare stop or a field stop. Said glare stop or said field stop is for eliminating the stray light and thereby improving the image resolution thereof.

In the present optical image capturing lens system, an aperture stop can be configured as a front stop or a middle stop. A front stop can provide a longer distance between an exit pupil of the system and an image plane, and the image-sensing efficiency of an image sensor can be improved. A middle stop is favorable for enlarging the field of view of the system and thereby provides a wider field of view for the same.

According to the optical image capturing lens system of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at the paraxial region and when the lens element has a concave surface, it indicates that the surface is concave at the paraxial region.

Figure 11:
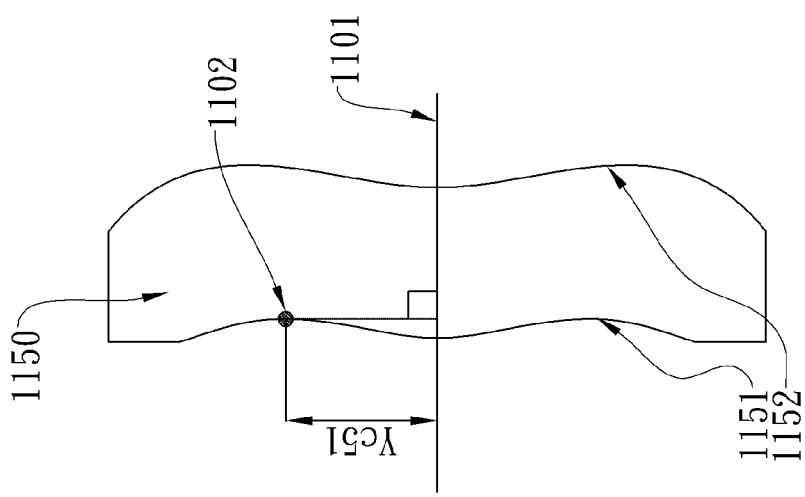
FIG. 11 indicates the distance represented by the relation of Yc51 of the present disclosure.

A critical point is referred as a tangential point on a surface of the lens element concerned where the corresponding tangent through the critical point is perpendicular to the optical axis. Please refer to FIG. 11. A vertical distance with respect to the optical axis 1101 between a critical point 1102 on the object-side surface 1151 of the fifth lens element 1150 and the optical axis 1101 is Yc51; wherein the critical point 1102 is not on the optical axis 1101.

The present optical image capturing lens system can be optionally applied to MEMS (Micro-Electro-Mechanical System) focusing and zoom optical systems. In addition, as the optical image capturing lens system has the advantages of superior aberration correction ability and finer image quality, it is suitable for applications in imaging systems such as 3D (3 dimensional) image capturing, digital cameras, portable devices, digital tablets and etc.

Preferred embodiments of the present disclosure will be described in the following paragraphs by referring to the accompanying drawings.

Embodiment 1

Figure 1B:
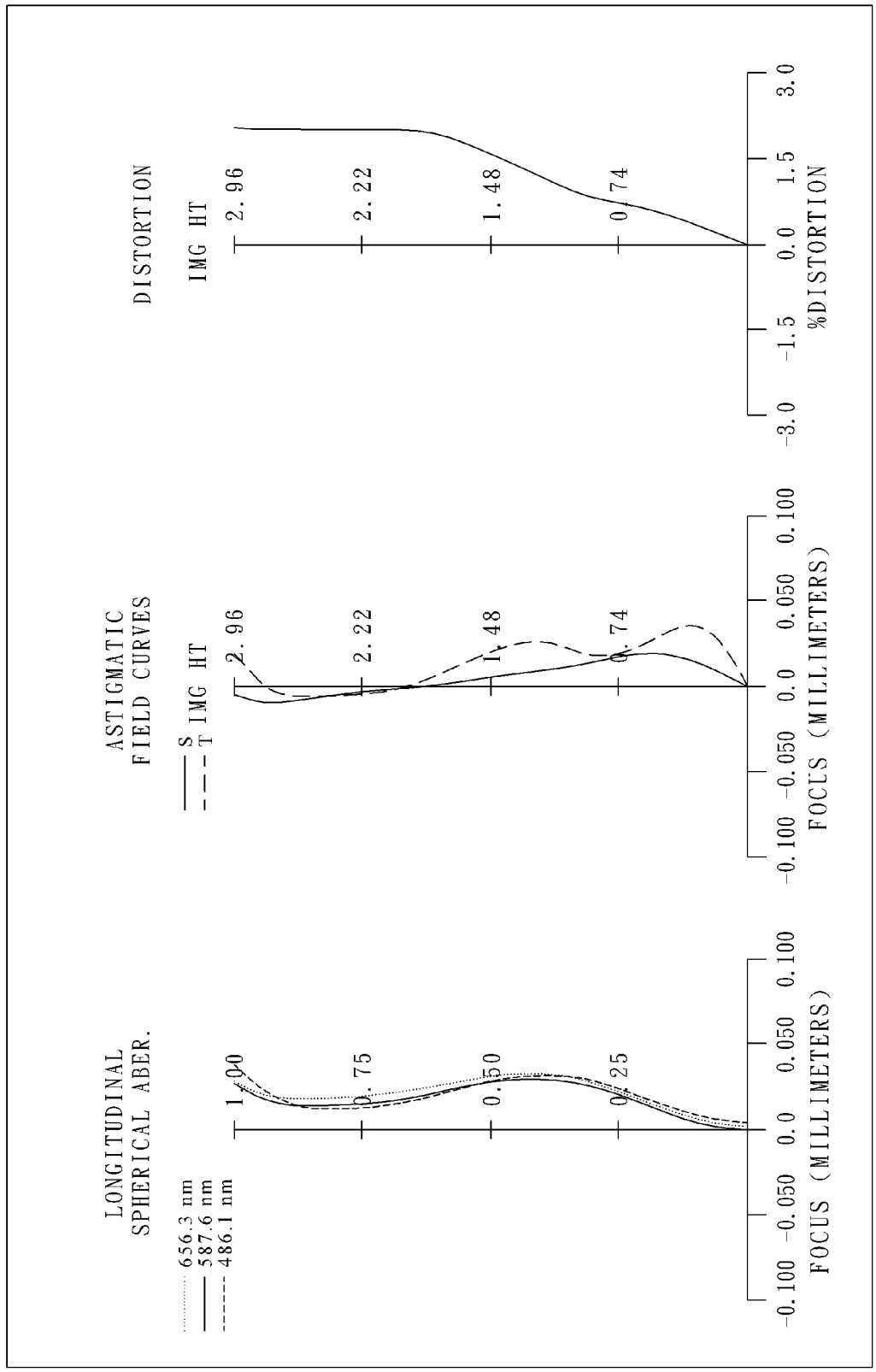
FIG. 1B shows the aberration curves of the first embodiment of the present disclosure.

FIG. 1A shows an optical image capturing lens system in accordance with the first embodiment of the present disclosure, and FIG. 1B shows the aberration curves of the first embodiment of the present disclosure. The optical image capturing lens system of the first embodiment of the present disclosure mainly comprises five lens elements with refractive power, in order from an object side to an image side:

a first lens element 110 made of plastic with positive refractive power having a convex object-side surface 111 and a convex image-side surface 112, and the object-side and image-side surfaces 111 and 112 thereof being aspheric;

a second lens element 120 made of plastic with negative refractive power having a convex object-side surface 121 and a concave image-side surface 122, and the object-side and image-side surfaces 121 and 122 thereof being aspheric;

a third lens element 130 made of plastic with positive refractive power having a convex object-side surface 131 and a convex image-side surface 132, and the object-side and image-side surfaces 131 and 132 thereof being aspheric;

a fourth lens element 140 made of plastic with negative refractive power having a concave object-side surface 141 and a convex image-side surface 142, the object-side and image-side surfaces 141 and 142 thereof being aspheric; and a fifth lens element 150 made of plastic with positive refractive power having a convex object-side surface 151 at a paraxial region and a concave image-side surface 152 at a paraxial region, the object-side and image-side surfaces 151 and 152 thereof being aspheric, and at least one inflection point is formed on both of the object-side surface 151 and the image-side surface 152;

wherein a stop 100, which is an aperture stop, is disposed between the imaged object and the first lens element 110; the optical image capturing lens system further comprises an IR-cut filter 160 disposed between the fifth lens element 150 and an image plane 180, and the IR-cut filter 160 is made of glass and has no influence on the focal length of the optical image capturing lens system.

The detailed optical data of the first embodiment is shown in TABLE 1, and the aspheric surface data is shown in TABLE 2, wherein the units of the curvature radius, the thickness and the focal length are expressed in mm, and HFOV is half of the maximal field of view.

TABLE 1

(Embodiment 1)

f = 3.74 mm, Fno = 2.20, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.175 | | | | |
| 2 | Lens 1 | 2.032 | ASP | 0.470 | Plastic | 1.544 | 55.9 | 3.71 |
| 3 | | −263.946 | ASP | 0.030 | | | | |
| 4 | Lens 2 | 2.181 | ASP | 0.250 | Plastic | 1.650 | 21.4 | −7.06 |
| 5 | | 1.412 | ASP | 0.284 | | | | |
| 6 | Lens 3 | 124.009 | ASP | 0.551 | Plastic | 1.544 | 55.9 | 5.05 |
| 7 | | −2.808 | ASP | 0.498 | | | | |
| 8 | Lens 4 | −0.630 | ASP | 0.320 | Plastic | 1.640 | 23.3 | −3.51 |
| 9 | | −1.049 | ASP | 0.030 | | | | |
| 10 | Lens 5 | 1.268 | ASP | 1.020 | Plastic | 1.535 | 55.7 | 4.30 |
| 11 | | 2.031 | ASP | 0.600 | | | | |
| 12 | IR-filter | Plano | | 0.300 | Glass | 1.517 | 64.2 | — |
| 13 | | Plano | | 0.646 | | | | |
| 14 | Image | Plano | | — | | | | |

Note:
Reference Wavelength is 587.6 nm (d-line).

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the relative distance between a point on the aspheric surface at a distance Y from the optical axis and the tangential plane at the aspheric surface vertex;

Y: the vertical distance from the point on the curve of the aspheric surface to the optical axis;

R: the curvature radius;

k: the conic coefficient;

TABLE 2

Aspheric Coefficients

| Surface # | 2 | 3 | 4 | 5 | 6 |
|---|---|---|---|---|---|
| k = | 1.0714E+00 | 5.0000E+00 | −1.5565E+01 | −6.2105E+00 | 5.0000E+00 |
| A4 = | −8.4108E−03 | 3.1583E−02 | 5.0526E−02 | 5.8404E−02 | −6.3337E−02 |
| A6 = | −1.5168E−03 | 2.9537E−02 | −3.0609E−02 | −1.5144E−02 | −4.9594E−03 |
| A8 = | 1.8056E−03 | −6.1921E−02 | −7.9384E−02 | −4.2118E−01 | 5.3428E−03 |
| A10 = | −8.8081E−02 | −1.8644E−01 | −2.6755E−02 | 1.5195E+00 | −8.6243E−03 |
| A12 = | 2.0966E−01 | 2.7117E−01 | −5.7592E−02 | −2.9598E+00 | −3.6756E−02 |
| A14 = | −2.2964E−01 | −2.1640E−01 | 1.9413E−02 | 2.6977E+00 | 3.0051E−01 |
| A16 = | 7.1422E−02 | 7.6083E−02 | 1.5743E−02 | −9.1379E−01 | −1.9391E−01 |

| Surface # | 7 | 8 | 9 | 10 | 11 |
|---|---|---|---|---|---|
| k = | 3.9473E+00 | −3.8979E+00 | −7.6363E−01 | −1.3482E+01 | −1.1042E+01 |
| A4 = | 5.3711E−03 | −2.5165E−01 | 1.0144E−01 | −9.9728E−02 | −4.8309E−02 |
| A6 = | −1.5353E−01 | 2.6756E−01 | 4.4522E−03 | 5.1553E−02 | 1.2017E−02 |
| A8 = | 4.3530E−01 | −4.2684E−02 | 3.3889E−02 | −3.0815E−02 | −3.9260E−03 |
| A10 = | −6.7201E−01 | −3.9255E−02 | −1.9174E−03 | 1.0557E−02 | 5.7301E−04 |
| A12 = | 6.3073E−01 | 1.1619E−02 | −4.8088E−03 | −1.5922E−03 | 4.2376E−06 |
| A14 = | −2.2943E−01 | 2.4649E−02 | −1.6018E−03 | 7.9380E−05 | −1.1853E−05 |
| A16 = | 2.8931E−02 | −1.6190E−02 | 7.6164E−04 | 3.2837E−07 | 9.7578E−07 |

Ai: the aspheric coefficient of order i.

In the first embodiment of the present optical image capturing lens system, the focal length of the optical image capturing lens system is f, the f-number of the optical image capturing lens system is Fno, half of the maximal field of view of the optical image capturing lens system is HFOV, and they satisfy the relations: f=3.74 (mm), Fno=2.20, HFOV=37.7 deg.

In the first embodiment of the present optical image capturing lens system, an Abbe number of the fourth lens element 140 is V4, an Abbe number of the fifth lens element 150 is V5, and they satisfy the relation: V4/V5=0.42.

In the first embodiment of the present optical image capturing lens system, a central thickness of the fourth lens element 140 is CT4, a central thickness of the fifth lens element 150 is CT5, and they satisfy the relation: CT4/CT5=0.31.

In the first embodiment of the present optical image capturing lens system, a central thickness of the second lens element 120 is CT2, a central thickness of the fourth lens element 140 is CT4, an axial distance between the second lens element 120 and the third lens element 130 is T23, an axial distance between the third lens element 130 and the fourth lens element 140 is T34, and they satisfy the relation: (CT2+CT4)/(T23+T34)=0.73.

In the first embodiment of the present optical image capturing lens system, an axial distance between the first lens element 110 and the second lens element 120 is T12, an axial distance between the second lens element 120 and the third lens element 130 is T23, and they satisfy the relation: T12/T23=0.11.

In the first embodiment of the present optical image capturing lens system, an axial distance between the fourth lens element 140 and the fifth lens element 150 is T45, an axial distance between the third lens element 130 and the fourth lens element 140 is T34, and they satisfy the relation: T45/T34=0.06.

In the first embodiment of the present optical image capturing lens system, a curvature radius of the object-side surface 121 of the second lens element 120 is R3, a curvature radius of the image-side surface 122 of the second lens element 120 is R4, and they satisfy the relation: (R3−R4)/(R3+R4)=0.21.

In the first embodiment of the present optical image capturing lens system, a curvature radius of the object-side surface 131 of the third lens element 130 is R5, a curvature radius of the image-side surface 132 of the third lens element 130 is R6, and they satisfy the relation: (R5+R6)/(R5−R6)=0.96.

In the first embodiment of the present optical image capturing lens system, a curvature radius of the object-side surface 141 of the fourth lens element 140 is R7, a curvature radius of the image-side surface 142 of the fourth lens element 140 is R8, and they satisfy the relation: (R7−R8)/(R7+R8)=−0.25.

In the first embodiment of the present optical image capturing lens system, a curvature radius of the object-side surface 151 of the fifth lens element 150 is R9, a curvature radius of the object-side surface 111 of the first lens element 110 is R1, and they satisfy the relation: R9/R1=0.62.

In the first embodiment of the present optical image capturing lens system, a focal length of the optical image capturing lens system is f, a focal length of the fifth lens element 150 is f5, and they satisfy the relation: f/f5=0.87.

In the first embodiment of the present optical image capturing lens system, a focal length of the fourth lens element 140 is f4, a focal length of the second lens element 120 is f2, and they satisfy the relation: f4/f2=0.50.

In the first embodiment of the present optical image capturing lens system, a vertical distance with respect to the optical axis between a non-axial critical point on the object-side surface 151 of the fifth lens element 150 and the optical axis is Yc51, a focal length of the optical image capturing lens system is f, and they satisfy the relation: Yc51/f=0.27.

Embodiment 2

Figure 2A:
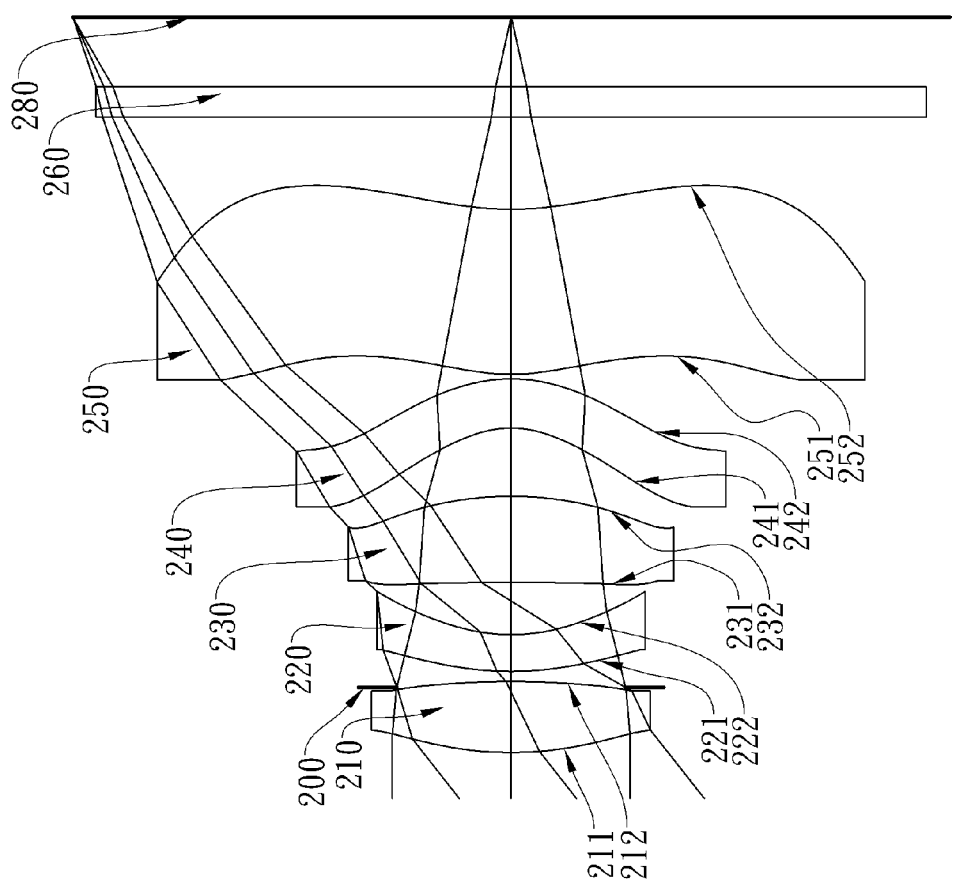
FIG. 2A shows an optical image capturing lens system in accordance with the second embodiment of the present disclosure.
Figure 2B:
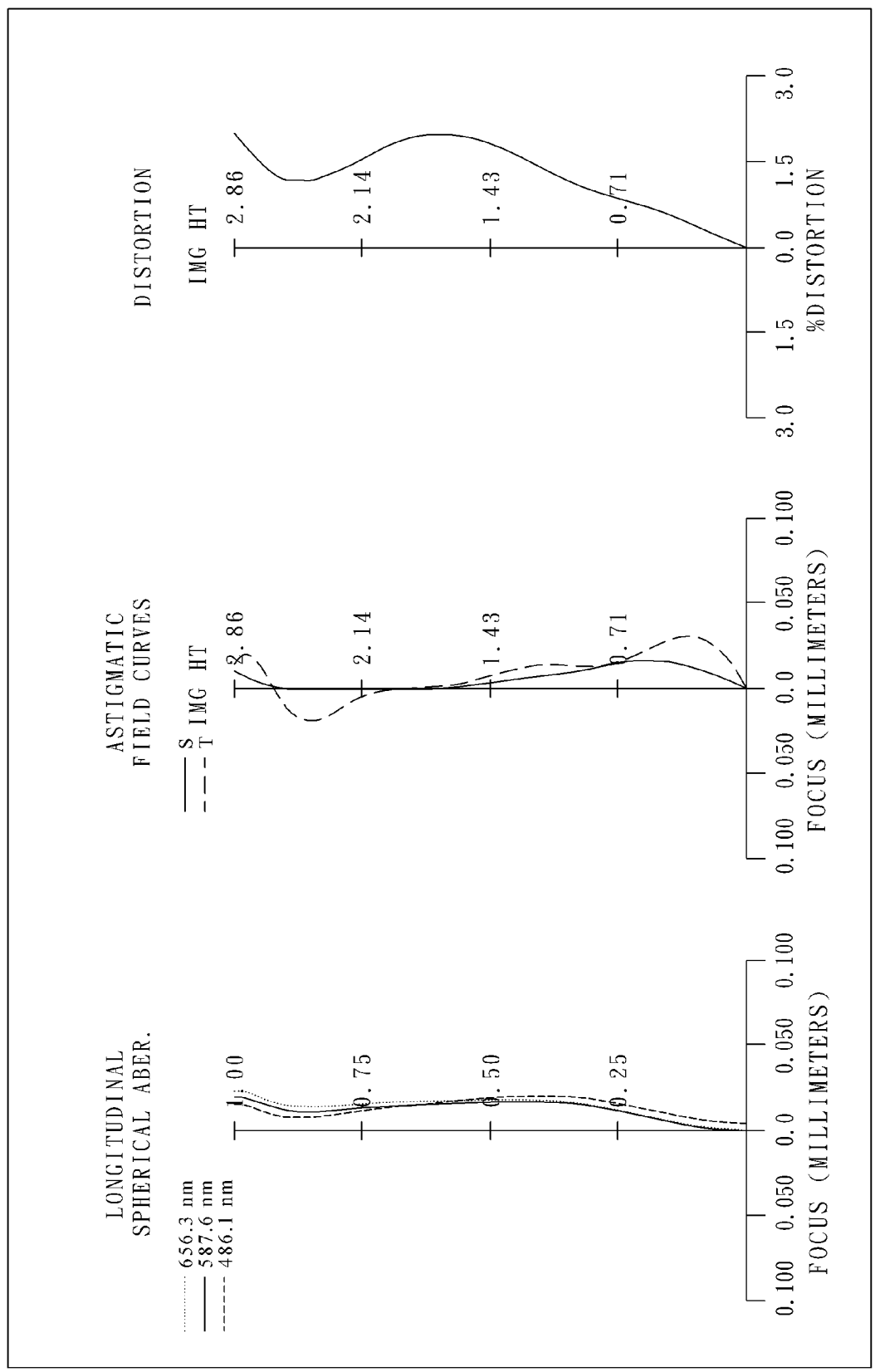
FIG. 2B shows the aberration curves of the second embodiment of the present disclosure.

FIG. 2A shows an optical image capturing lens system in accordance with the second embodiment of the present disclosure, and FIG. 2B shows the aberration curves of the second embodiment of the present disclosure. The optical image capturing lens system of the second embodiment of the present disclosure mainly comprises five lens elements with refractive power, in order from an object side to an image side:

a first lens element 210 made of plastic with positive refractive power having a convex object-side surface 211 and a convex image-side surface 212, and the object-side and image-side surfaces 211 and 212 thereof being aspheric;

a second lens element 220 made of plastic with negative refractive power having a convex object-side surface 221 and a concave image-side surface 222, and the object-side and image-side surfaces 221 and 222 thereof being aspheric;

a third lens element 230 made of plastic with positive refractive power having a concave object-side surface 231 and a convex image-side surface 232, and the object-side and image-side surfaces 231 and 232 thereof being aspheric;

a fourth lens element 240 made of plastic with negative refractive power having a concave object-side surface 241 and a convex image-side surface 242, the object-side and image-side surfaces 241 and 242 thereof being aspheric; and a fifth lens element 250 made of plastic with positive refractive power having a convex object-side surface 251 at a paraxial region and a concave image-side surface 252 at a paraxial region, the object-side and image-side surfaces 251 and 252 thereof being aspheric, and at least one inflection point is formed on both of the object-side surface 251 and the image-side surface 252;

wherein a stop 200, which is an aperture stop, is disposed between the first lens element 210 and the second lens element 220; the optical image capturing lens system further comprises an IR-cut filter 260 disposed between the fifth lens element 250 and an image plane 280, and the IR-cut filter 260 is made of glass and has no influence on the focal length of the optical image capturing lens system.

The detailed optical data of the second embodiment is shown in TABLE 3, and the aspheric surface data is shown in TABLE 4, wherein the units of the curvature radius, the thickness and the focal length are expressed in mm, and HFOV is half of the maximal field of view.

TABLE 3

(Embodiment 2)

f = 3.56 mm, Fno = 2.30, HFOV = 38.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.225 | ASP | 0.462 | Plastic | 1.544 | 55.9 | 3.01 |
| 2 | | −5.766 | ASP | −0.037 | | | | |
| 3 | Ape. Stop | Plano | | 0.104 | | | | |
| 4 | Lens 2 | 1.946 | ASP | 0.240 | Plastic | 1.634 | 23.8 | −4.93 |
| 5 | | 1.142 | ASP | 0.340 | | | | |
| 6 | Lens 3 | −36.661 | ASP | 0.562 | Plastic | 1.544 | 55.9 | 4.48 |
| 7 | | −2.299 | ASP | 0.447 | | | | |
| 8 | Lens 4 | −0.617 | ASP | 0.320 | Plastic | 1.634 | 23.8 | −3.30 |
| 9 | | −1.051 | ASP | 0.030 | | | | |
| 10 | Lens 5 | 1.288 | ASP | 1.077 | Plastic | 1.535 | 55.7 | 4.40 |
| 11 | | 2.015 | ASP | 0.600 | | | | |
| 12 | IR-filter | Plano | | 0.200 | Glass | 1.517 | 64.2 | — |
| 13 | | Plano | | 0.454 | | | | |
| 14 | Image | Plano | | — | | | | |

Note:
Reference Wavelength is 587.6 nm (d-line).

TABLE 4

Aspheric Coefficients

| Surface # | 1 | 2 | 4 | 5 | 6 |
|---|---|---|---|---|---|
| k = | 8.1653E−02 | 3.0000E+00 | −1.5293E+01 | −5.0817E+00 | −2.0000E+01 |
| A4 = | −2.3778E−02 | 8.3530E−03 | 5.8783E−02 | 9.8192E−02 | −3.9138E−02 |
| A6 = | −2.4824E−02 | 2.1303E−02 | 1.3571E−03 | 2.9680E−02 | 7.8360E−03 |
| A8 = | −1.3837E−02 | −7.1084E−02 | −6.6352E−02 | −4.0958E−01 | 2.7004E−02 |
| A10 = | −8.8738E−02 | −1.6692E−01 | 3.5704E−02 | 1.5179E+00 | 1.3182E−02 |
| A12 = | 2.0966E−01 | 1.2529E−01 | −2.4991E−02 | −2.8963E+00 | −9.0889E−04 |
| A14 = | −2.2964E−01 | 3.8258E−01 | −6.2266E−02 | 2.6734E+00 | 1.6702E−01 |
| A16 = | 7.1422E−02 | −4.1985E−01 | 9.3994E−02 | −9.4575E−01 | −1.2946E−01 |

| Surface # | 7 | 8 | 9 | 10 | 11 |
|---|---|---|---|---|---|
| k = | 3.0920E+00 | −3.7600E+00 | −7.5294E−01 | −1.4088E+01 | −9.8363E+00 |
| A4 = | 3.7574E−02 | −2.4507E−01 | 9.7868E−02 | −1.1142E−01 | −5.1064E−02 |
| A6 = | −1.3289E−01 | 2.7240E−01 | 2.8868E−03 | 5.7981E−02 | 1.2850E−02 |
| A8 = | 4.4631E−01 | −4.6102E−02 | 3.4716E−02 | −3.0555E−02 | −4.1512E−03 |
| A10 = | −6.8889E−01 | −4.4372E−02 | −1.3598E−02 | 1.0399E−02 | 5.6347E−04 |
| A12 = | 6.1427E−01 | 9.0807E−03 | −4.5951E−03 | −1.6411E−03 | 6.0360E−06 |
| A14 = | −2.3058E−01 | 2.5005E−02 | −1.5202E−03 | 7.4194E−05 | −1.2173E−05 |
| A16 = | 4.2667E−02 | −1.2040E−02 | 6.9837E−04 | 3.5469E−06 | 1.1103E−06 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| f [mm] | 3.56 | (R3 − R4)/(R3 + R4) | 0.26 |
|---|---|---|---|
| Fno | 2.30 | (R5 + R6)/(R5 − R6) | 1.13 |
| HFOV [deg.] | 38.1 | (R7 − R8)/(R7 + R8) | −0.26 |
| V4/V5 | 0.43 | R9/R1 | 0.58 |
| CT4/CT5 | 0.30 | f/f5 | 0.81 |
| (CT2 + CT4)/(T23 + T34) | 0.71 | f4/f2 | 0.67 |
| T12/T23 | 0.20 | Yc51/f | 0.28 |
| T45/T34 | 0.07 | | |

Embodiment 3

Figure 3A:
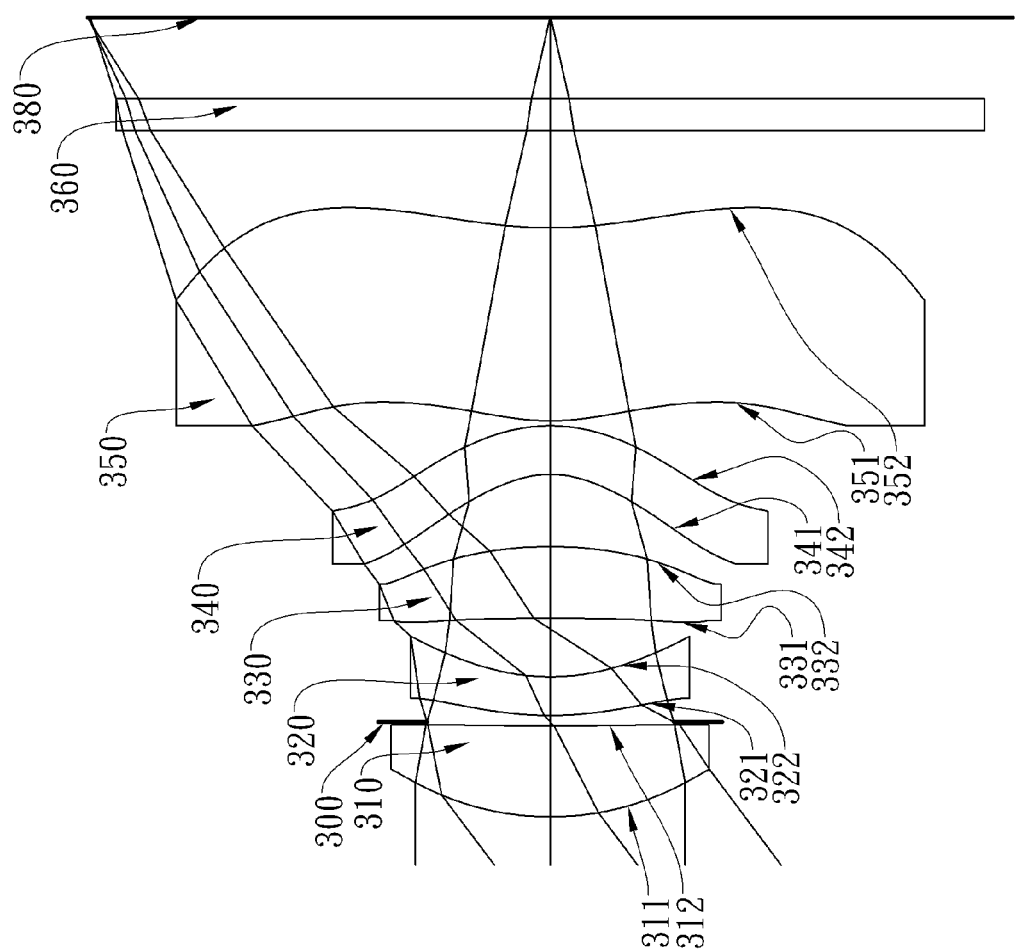
FIG. 3A shows an optical image capturing lens system in accordance with the third embodiment of the present disclosure.
Figure 3B:
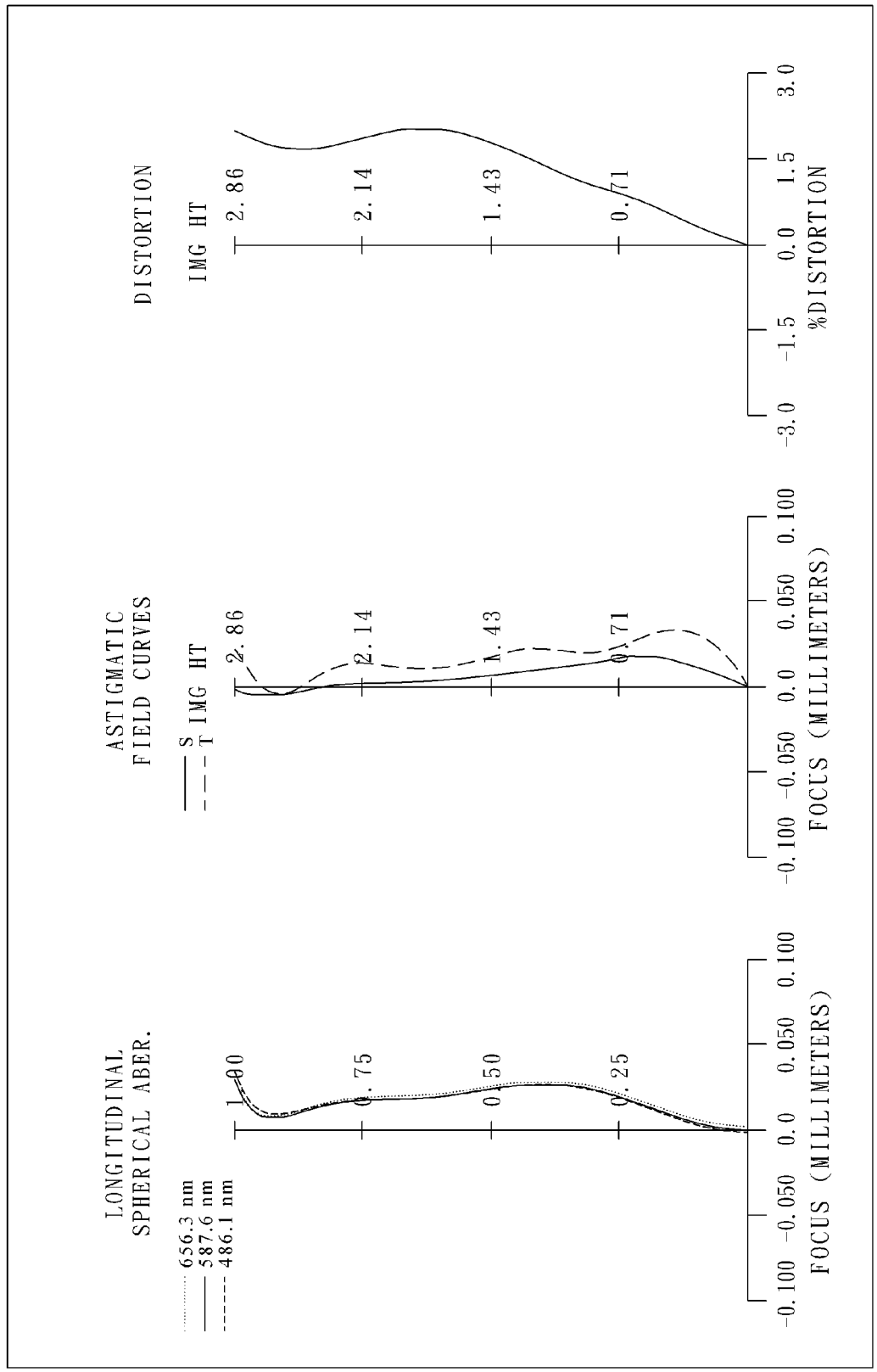
FIG. 3B shows the aberration curves of the third embodiment of the present disclosure.

FIG. 3A shows an optical image capturing lens system in accordance with the third embodiment of the present disclosure, and FIG. 3B shows the aberration curves of the third embodiment of the present disclosure. The optical image capturing lens system of the third embodiment of the present disclosure mainly comprises five lens elements with refractive power, in order from an object side to an image side:

a first lens element 310 made of plastic with positive refractive power having a convex object-side surface 311 and a concave image-side surface 312, and the object-side and image-side surfaces 311 and 312 thereof being aspheric;

a second lens element 320 made of plastic with negative refractive power having a convex object-side surface 321 and a concave image-side surface 322, and the object-side and image-side surfaces 321 and 322 thereof being aspheric;

a third lens element 330 made of plastic with positive refractive power having a concave object-side surface 331 and a convex image-side surface 332, and the object-side and image-side surfaces 331 and 332 thereof being aspheric;

a fourth lens element 340 made of plastic with negative refractive power having a concave object-side surface 341 and a convex image-side surface 342, the object-side and image-side surfaces 341 and 342 thereof being aspheric; and a fifth lens element 350 made of plastic with positive refractive power having a convex object-side surface 351 at a paraxial region and a concave image-side surface 352 at a paraxial region, the object-side and image-side surfaces 351 and 352 thereof being aspheric, and at least one inflection point is formed on both of the object-side surface 351 and the image-side surface 352;

wherein a stop 300, which is an aperture stop, is disposed between the first lens element 310 and the second lens element 320; the optical image capturing lens system further comprises an IR-cut filter 360 disposed between the fifth lens element 350 and an image plane 380, and the IR-cut filter 360 is made of glass and has no influence on the focal length of the optical image capturing lens system.

The detailed optical data of the third embodiment is shown in TABLE 6, and the aspheric surface data is shown in TABLE 7, wherein the units of the curvature radius, the thickness and the focal length are expressed in mm, and HFOV is half of the maximal field of view.

TABLE 6

(Embodiment 3)

f = 3.72 mm, Fno = 2.23, HFOV = 36.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.773 | ASP | 0.561 | Plastic | 1.544 | 55.9 | 3.55 |
| 2 | | 19.077 | ASP | 0.026 | | | | |
| 3 | Ape. Stop | Plano | | 0.039 | | | | |
| 4 | Lens 2 | 2.004 | ASP | 0.240 | Plastic | 1.640 | 23.3 | −6.66 |
| 5 | | 1.299 | ASP | 0.362 | | | | |
| 6 | Lens 3 | −27.186 | ASP | 0.444 | Plastic | 1.544 | 55.9 | 5.04 |
| 7 | | −2.509 | ASP | 0.448 | | | | |
| 8 | Lens 4 | −0.609 | ASP | 0.300 | Plastic | 1.640 | 23.3 | −3.23 |
| 9 | | −1.031 | ASP | 0.030 | | | | |
| 10 | Lens 5 | 1.333 | ASP | 1.195 | Plastic | 1.535 | 55.7 | 3.91 |
| 11 | | 2.523 | ASP | 0.600 | | | | |
| 12 | IR-filter | Plano | | 0.200 | Glass | 1.517 | 64.2 | — |
| 13 | | Plano | | 0.502 | | | | |
| 14 | Image | Plano | | — | | | | |

Note:
Reference Wavelength is 587.6 nm (d-line).

TABLE 7

| Aspheric Coefficients | | | | | |
|---|---|---|---|---|---|
| Surface # | 1 | 2 | 4 | 5 | 6 |
| k = | 7.4089E−01 | 0.0000E+00 | −1.4645E+01 | −4.5241E+00 | −1.0486E+01 |
| A4 = | −9.7144E−03 | −4.0634E−02 | 2.4701E−02 | 7.1973E−02 | −4.0175E−02 |
| A6 = | 6.0601E−03 | 8.0257E−02 | −6.9002E−02 | 2.1410E−02 | −1.2917E−02 |
| A8 = | −2.6776E−02 | −2.5643E−02 | −5.3423E−03 | −4.0160E−01 | 5.7505E−02 |
| A10 = | −5.7273E−02 | −1.8898E−01 | 7.5517E−02 | 1.5419E+00 | −3.1388E−02 |
| A12 = | 2.0966E−01 | 1.7287E−01 | −1.0039E−01 | −2.9198E+00 | −1.5407E−01 |
| A14 = | −2.2964E−01 | −9.6660E−02 | −2.2328E−01 | 2.7105E+00 | 3.9953E−01 |
| A16 = | 7.1422E−02 | 7.0652E−02 | 2.6241E−01 | −9.8661E−01 | −2.0640E−01 |
| Surface # | 7 | 8 | 9 | 10 | 11 |

TABLE 7-continued

Aspheric Coefficients

| k = | 3.1869E+00 | −3.6037E+00 | −7.2059E−01 | −1.5560E+01 | −1.0263E+01 |
|---|---|---|---|---|---|
| A4 = | 1.0018E−02 | −2.8387E−01 | 7.5879E−02 | −1.0345E−01 | −5.2325E−02 |
| A6 = | −1.4325E−01 | 2.8247E−01 | 7.8950E−03 | 5.6197E−02 | 1.3950E−02 |
| A8 = | 4.4378E−01 | −3.5626E−02 | 3.7322E−02 | −3.0877E−02 | −4.2635E−03 |
| A10 = | −6.9808E−01 | −4.1760E−02 | −7.1500E−02 | 1.0422E−02 | 5.5549E−04 |
| A12 = | 6.0487E−01 | 6.1130E−03 | −4.5614E−03 | −1.6199E−03 | 9.5805E−06 |
| A14 = | −2.3358E−01 | 2.2746E−02 | −1.5942E−03 | 7.7794E−05 | −1.1168E−05 |
| A16 = | 4.3455E−02 | −1.2156E−02 | 6.0200E−04 | 2.3766E−06 | 9.1396E−07 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| f [mm] | 3.72 | (R3 − R4)/(R3 + R4) | 0.21 |
|---|---|---|---|
| Fno | 2.23 | (R5 + R6)/(R5 − R6) | 1.20 |
| HFOV [deg.] | 36.9 | (R7 − R8)/(R7 + R8) | −0.26 |
| V4/V5 | 0.42 | R9/R1 | 0.75 |
| CT4/CT5 | 0.25 | f/f5 | 0.95 |
| (CT2 + CT4)/(T23 + T34) | 0.67 | f4/f2 | 0.48 |
| T12/T23 | 0.18 | Yc51/f | 0.27 |
| T45/T34 | 0.07 | | |

Embodiment 4

Figure 4A:
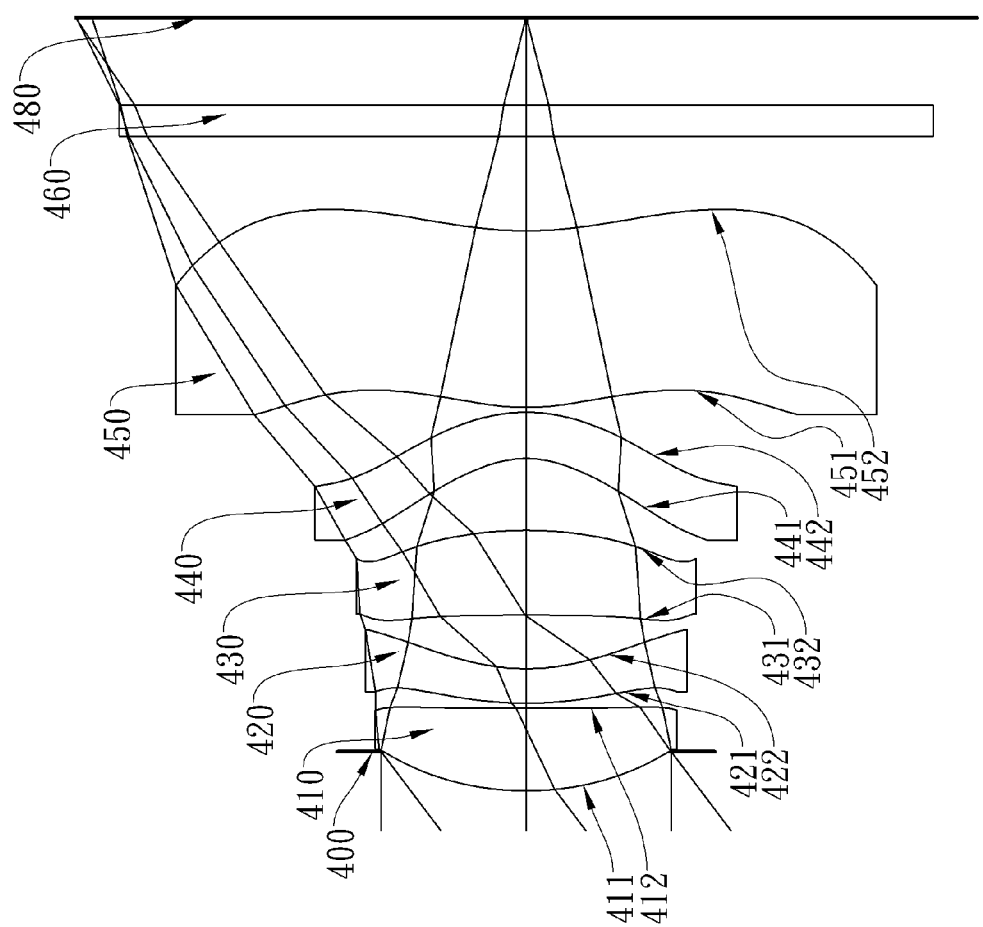
FIG. 4A shows an optical image capturing lens system in accordance with the fourth embodiment of the present disclosure.
Figure 4B:
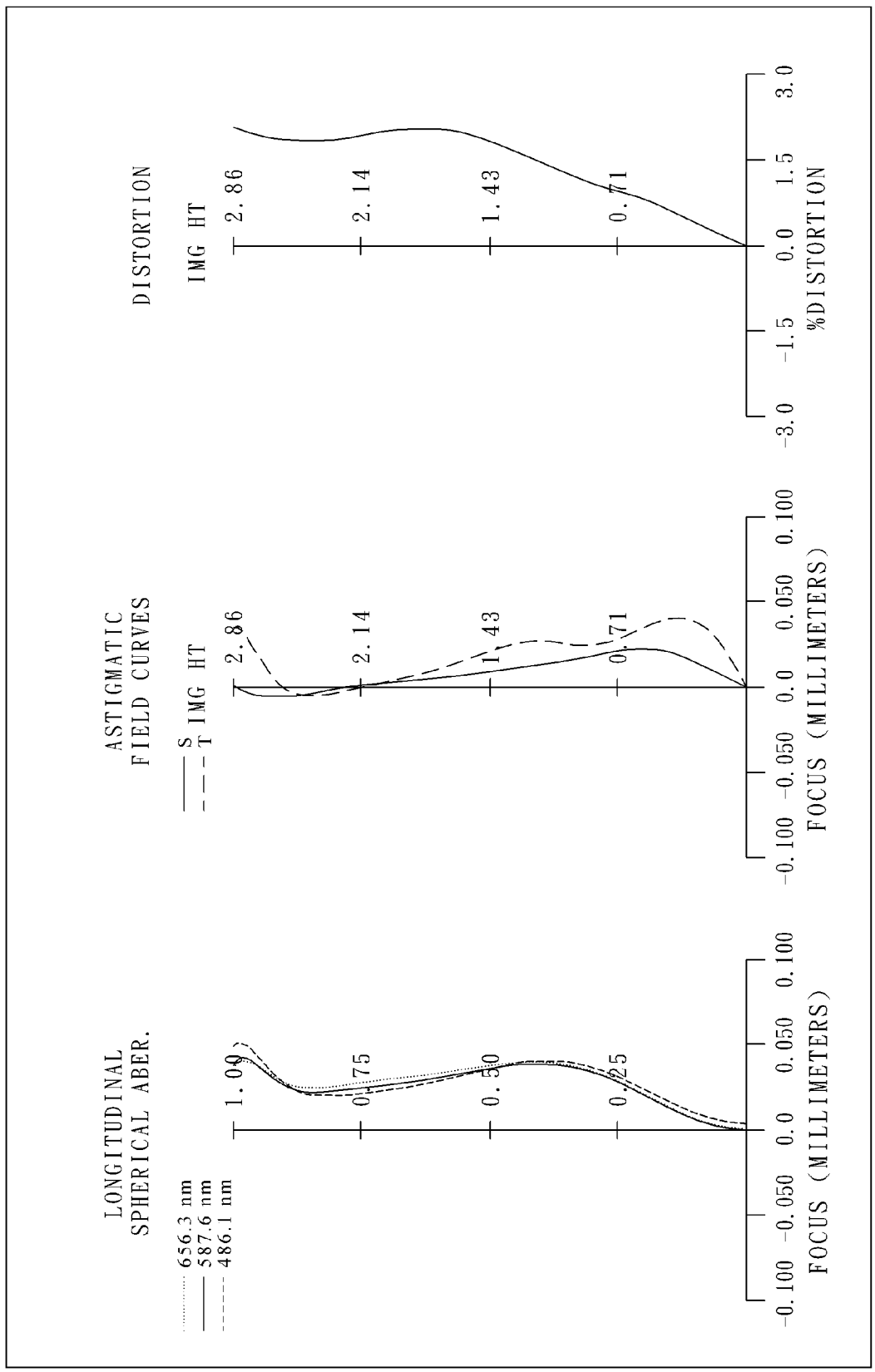
FIG. 4B shows the aberration curves of the fourth embodiment of the present disclosure.

FIG. 4A shows an optical image capturing lens system in accordance with the fourth embodiment of the present disclosure, and FIG. 4B shows the aberration curves of the fourth embodiment of the present disclosure. The optical image capturing lens system of the fourth embodiment of the present disclosure mainly comprises five lens elements with refractive power, in order from an object side to an image side:

a first lens element 410 made of plastic with positive refractive power having a convex object-side surface 411 and a convex image-side surface 412, and the object-side and image-side surfaces 411 and 412 thereof being aspheric;

a second lens element 420 made of plastic with negative refractive power having a convex object-side surface 421 and a concave image-side surface 422, and the object-side and image-side surfaces 421 and 422 thereof being aspheric;

a third lens element 430 made of plastic with positive refractive power having a concave object-side surface 431 and a convex image-side surface 432, and the object-side and image-side surfaces 431 and 432 thereof being aspheric;

a fourth lens element 440 made of plastic with negative refractive power having a concave object-side surface 441 and a convex image-side surface 442, the object-side and image-side surfaces 441 and 442 thereof being aspheric; and a fifth lens element 450 made of plastic with positive refractive power having a convex object-side surface 451 at a paraxial region and a concave image-side surface 452 at a paraxial region, the object-side and image-side surfaces 451 and 452 thereof being aspheric, and at least one inflection point is formed on both of the object-side surface 451 and the image-side surface 452;

wherein a stop 400, which is an aperture stop, is disposed between the imaged object and the first lens element 410; the optical image capturing lens system further comprises an IR-cut filter 460 disposed between the fifth lens element 450 and an image plane 480, and the IR-cut filter 460 is made of glass and has no influence on the focal length of the optical image capturing lens system.

The detailed optical data of the fourth embodiment is shown in TABLE 9, and the aspheric surface data is shown in TABLE 10, wherein the units of the curvature radius, the thickness and the focal length are expressed in mm, and HFOV is half of the maximal field of view.

TABLE 9

(Embodiment 4)

f = 3.68 mm, Fno = 2.00, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.248 | | | | |
| 2 | Lens 1 | 1.847 | ASP | 0.526 | Plastic | 1.544 | 55.9 | 3.29 |
| 3 | | −50.954 | ASP | 0.030 | | | | |
| 4 | Lens 2 | 2.148 | ASP | 0.220 | Plastic | 1.640 | 23.3 | −5.96 |
| 5 | | 1.319 | ASP | 0.340 | | | | |
| 6 | Lens 3 | −48.887 | ASP | 0.539 | Plastic | 1.544 | 55.9 | 5.23 |
| 7 | | −2.701 | ASP | 0.458 | | | | |
| 8 | Lens 4 | −0.635 | ASP | 0.294 | Plastic | 1.640 | 23.3 | −3.41 |
| 9 | | −1.057 | ASP | 0.030 | | | | |
| 10 | Lens 5 | 1.335 | ASP | 1.123 | Plastic | 1.544 | 55.9 | 4.21 |
| 11 | | 2.250 | ASP | 0.600 | | | | |
| 12 | IR-filter | Plano | | 0.200 | Glass | 1.517 | 64.2 | — |
| 13 | | Plano | | 0.554 | | | | |
| 14 | Image | Plano | | — | | | | |

TABLE 9-continued (Embodiment 4)

f = 3.68 mm, Fno = 2.00, HFOV = 37.1 deg.

| Surface # | Curvature Radius | Thickness | Material | Index | Abbe # | Focal Length |
|---|---|---|---|---|---|---|

Note:
Reference Wavelength is 587.6 nm (d-line).

TABLE 10

Aspheric Coefficients

| | Surface # | | | | |
|---|---|---|---|---|---|
| | 2 | 3 | 4 | 5 | 6 |
| k = | 1.0829E+00 | 0.0000E+00 | −1.8753E+01 | −6.2538E+00 | −1.0000E+00 |
| A4 = | −9.1391E−03 | 3.7581E−02 | 3.4444E−02 | 5.9180E−02 | −6.3131E−02 |
| A6 = | −3.9936E−04 | 5.1245E−02 | −2.1882E−02 | −9.5912E−03 | −4.9236E−03 |
| A8 = | 3.4520E−03 | −4.8719E−02 | −5.0533E−02 | −4.0733E−01 | 5.4422E−03 |
| A10 = | −8.7179E−02 | −1.7981E−01 | −3.1008E−02 | 1.5320E+00 | −1.3181E−02 |
| A12 = | 2.2756E−01 | 2.8399E−01 | −7.4777E−02 | −2.9676E+00 | −3.8945E−02 |
| A14 = | −2.3055E−01 | −2.4277E−01 | 5.8911E−03 | 2.6898E+00 | 2.9359E−01 |
| A16 = | 6.7784E−02 | 7.7891E−02 | 4.2469E−02 | −9.0369E−01 | −1.8213E−01 |

| | Surface # | | | | |
|---|---|---|---|---|---|
| | 7 | 8 | 9 | 10 | 11 |
| k = | 3.9699E+00 | −3.8803E+00 | −7.4308E−01 | −1.5877E+01 | −1.0475E+01 |
| A4 = | 1.2672E−04 | −2.4898E−01 | 9.2494E−02 | −1.0634E−01 | −5.1258E−02 |
| A6 = | −1.4563E−01 | 2.5654E−01 | 9.6358E−03 | 5.2878E−02 | 1.2411E−02 |
| A8 = | 4.2826E−01 | −4.3146E−02 | 3.4183E−02 | −3.0336E−02 | −3.9218E−03 |
| A10 = | −6.7890E−01 | −3.4223E−02 | −2.2157E−03 | 1.0604E−02 | 5.5943E−04 |
| A12 = | 6.3172E−01 | 1.3252E−02 | −4.7160E−03 | −1.5962E−03 | 4.4047E−06 |
| A14 = | −2.2629E−01 | 2.3847E−02 | −1.5381E−03 | 6.9786E−05 | −1.1802E−05 |
| A16 = | 2.8689E−02 | −1.6582E−02 | 6.6311E−04 | 8.0575E−07 | 1.0210E−06 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f [mm] | 3.68 | (R3 − R4)/(R3 + R4) | 0.24 |
|---|---|---|---|
| Fno | 2.00 | (R5 + R6)/(R5 − R6) | 1.12 |
| HFOV [deg.] | 37.1 | (R7 − R8)/(R7 + R8) | −0.25 |
| V4/V5 | 0.42 | R9/R1 | 0.72 |
| CT4/CT5 | 0.26 | f/f5 | 0.87 |
| (CT2 + CT4)/(T23 + T34) | 0.64 | f4/f2 | 0.57 |
| T12/T23 | 0.09 | Yc51/f | 0.26 |
| T45/T34 | 0.07 | | |

Embodiment 5

Figure 5A:
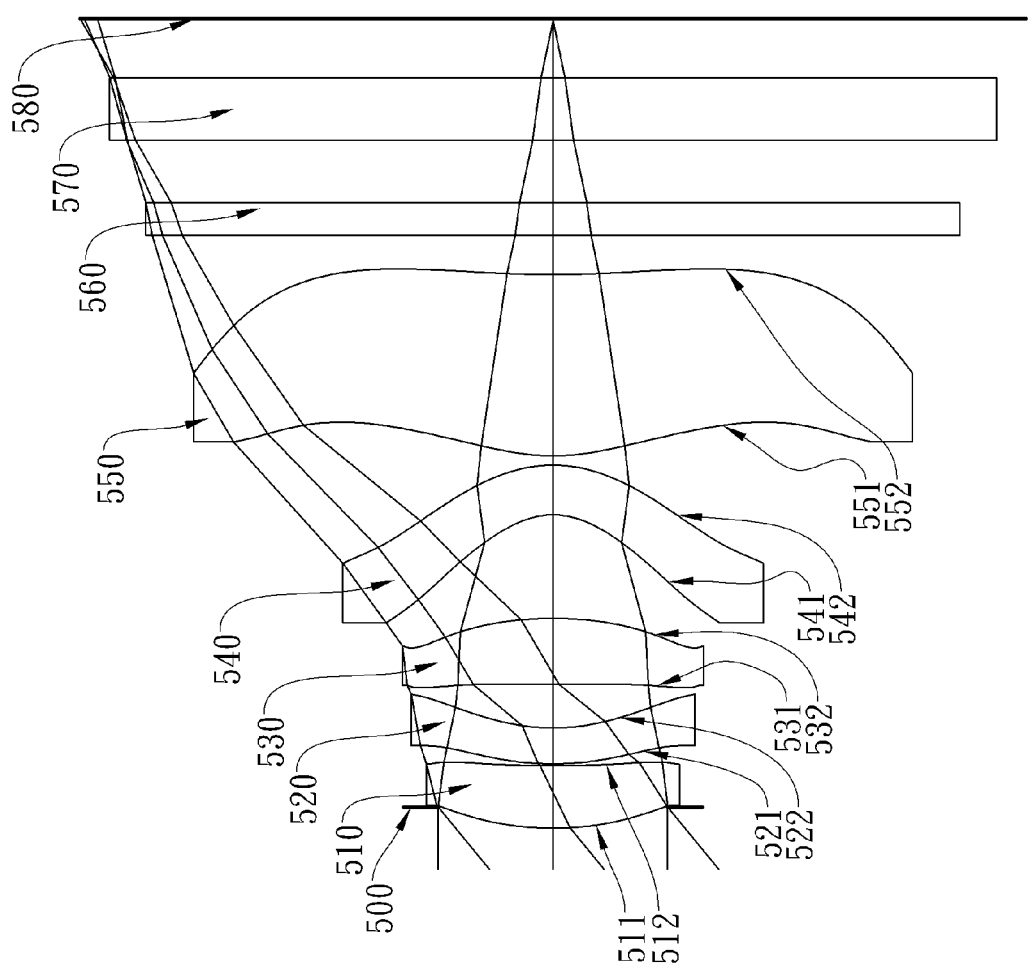
FIG. 5A shows an optical image capturing lens system in accordance with the fifth embodiment of the present disclosure.
Figure 5B:
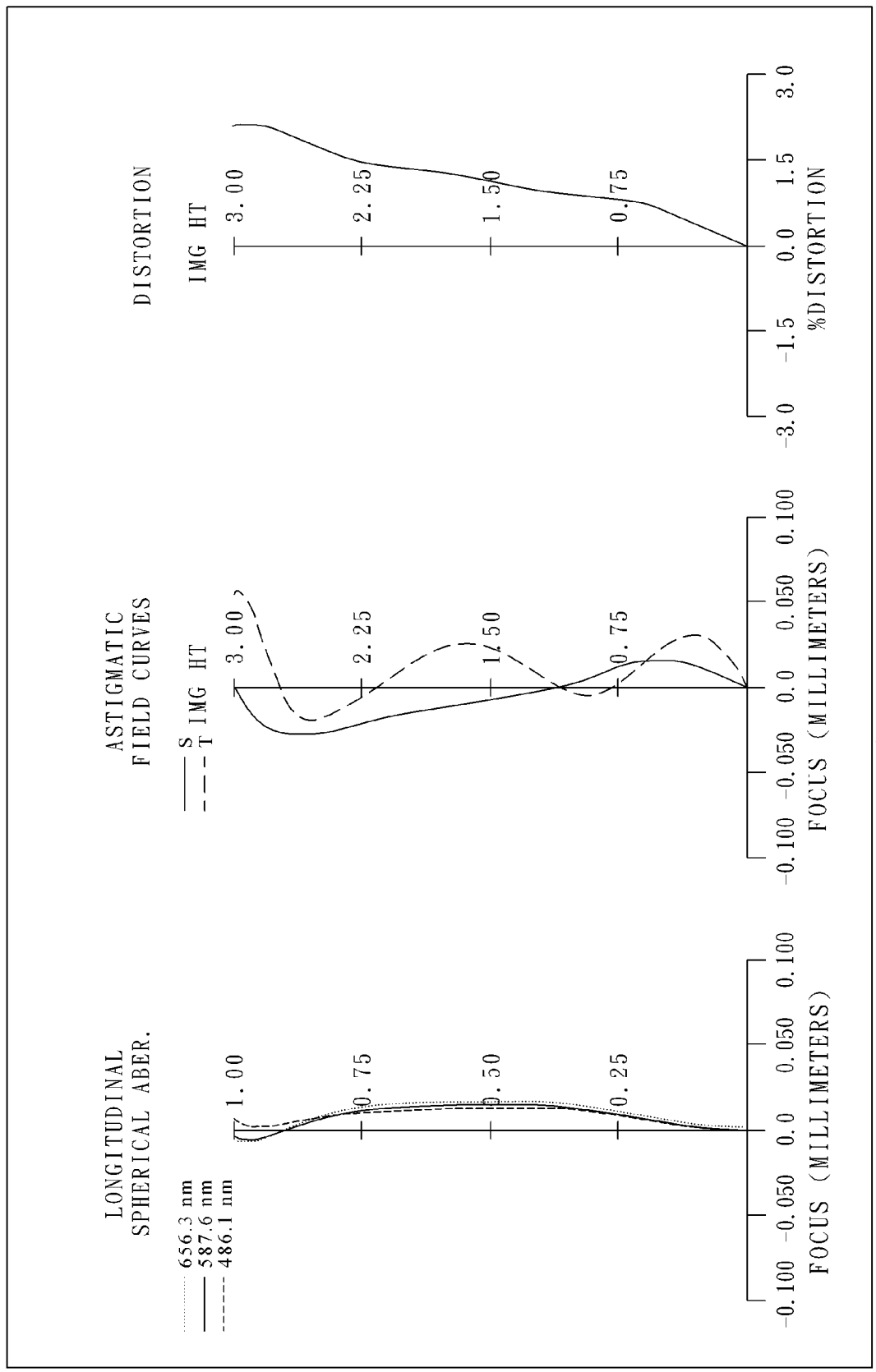
FIG. 5B shows the aberration curves of the fifth embodiment of the present disclosure.

FIG. 5A shows an optical image capturing lens system in accordance with the fifth embodiment of the present disclosure, and FIG. 5B shows the aberration curves of the fifth embodiment of the present disclosure. The optical image capturing lens system of the fifth embodiment of the present disclosure mainly comprises five lens elements with refractive power, in order from an object side to an image side:

a first lens element 510 made of plastic with positive refractive power having a convex object-side surface 511 and a concave image-side surface 512, and the object-side and image-side surfaces 511 and 512 thereof being aspheric;

a second lens element 520 made of plastic with negative refractive power having a convex object-side surface 521 and a concave image-side surface 522, and the object-side and image-side surfaces 521 and 522 thereof being aspheric;

a third lens element 530 made of plastic with positive refractive power having a convex object-side surface 531 and a convex image-side surface 532, and the object-side and image-side surfaces 531 and 532 thereof being aspheric;

a fourth lens element 540 made of plastic with negative refractive power having a concave object-side surface 541 and a convex image-side surface 542, the object-side and image-side surfaces 541 and 542 thereof being aspheric; and a fifth lens element 550 made of plastic with positive refractive power having a convex object-side surface 551 at a paraxial region and a concave image-side surface 552 at a paraxial region, the object-side and image-side surfaces 551 and 552 thereof being aspheric, and at least one inflection point is formed on both of the object-side surface 551 and the image-side surface 552;

wherein a stop 500, which is an aperture stop, is disposed between the imaged object and the first lens element 510; the optical image capturing lens system further comprises an IR-cut filter 560 and a cover glass 570 disposed sequentially between the fifth lens element 550 and an image plane 580, and both of the IR-cut filter 560 and a cover glass 570 are made of glass and have no influence on the focal length of the optical image capturing lens system.

The detailed optical data of the fifth embodiment is shown in TABLE 12, and the aspheric surface data is shown in TABLE 13, wherein the units of the curvature radius, the thickness and the focal length are expressed in mm, and HFOV is half of the maximal field of view.

TABLE 12

(Embodiment 5)

f = 3.58 mm, Fno = 2.44, HFOV = 39.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.135 | | | | |
| 2 | Lens 1 | 1.920 | ASP | 0.400 | Plastic | 1.544 | 55.9 | 4.49 |
| 3 | | 8.304 | ASP | 0.012 | | | | |
| 4 | Lens 2 | 1.761 | ASP | 0.230 | Plastic | 1.640 | 23.3 | −8.47 |
| 5 | | 1.261 | ASP | 0.279 | | | | |
| 6 | Lens 3 | 21.828 | ASP | 0.423 | Plastic | 1.544 | 55.9 | 3.96 |
| 7 | | −2.372 | ASP | 0.664 | | | | |
| 8 | Lens 4 | −0.467 | ASP | 0.318 | Plastic | 1.640 | 23.3 | −2.29 |
| 9 | | −0.868 | ASP | 0.059 | | | | |
| 10 | Lens 5 | 1.250 | ASP | 1.161 | Plastic | 1.544 | 55.9 | 2.66 |
| 11 | | 6.162 | ASP | 0.250 | | | | |
| 12 | IR-filter | Plano | | 0.210 | Glass | 1.517 | 64.2 | — |
| 13 | | Plano | | 0.400 | | | | |
| 14 | Cover-glass | Plano | | 0.400 | Glass | 1.517 | 64.2 | — |
| 15 | | Plano | | 0.380 | | | | |
| 16 | Image | Plano | | — | | | | |

Note:
Reference Wavelength is 587.6 nm (d-line).

TABLE 13

Aspheric Coefficients

| Surface # | | | | |
|---|---|---|---|---|
| 2 | 3 | 4 | 5 | 6 |

| | 2 | 3 | 4 | 5 | 6 |
|---|---|---|---|---|---|
| k = | 1.2073E+00 | 9.9000E+01 | −9.2527E+00 | −5.4246E+00 | 9.9000E+01 |
| A4 = | 2.4422E−03 | 4.2679E−02 | 5.8938E−02 | 6.9015E−02 | −9.3742E−02 |
| A6 = | −3.3738E−02 | −1.0949E−01 | −3.9721E−02 | −9.8064E−02 | −6.7721E−02 |
| A8 = | −2.3463E−02 | −1.9110E−01 | −1.9504E−01 | 3.5137E−01 | 4.7605E−02 |
| A10 = | −1.2298E−01 | −2.0823E−01 | −9.3475E−02 | −1.2152E+00 | 1.1916E−01 |
| A12 = | 2.6706E−01 | 3.5859E−01 | −1.4695E−01 | 1.4063E+00 | −7.4447E−03 |
| A14 = | −2.8710E−01 | −2.1104E−01 | 2.8033E−01 | −6.6888E−01 | −1.2667E−02 |
| A16 = | 3.1835E−05 | 3.3569E−05 | 1.7263E−01 | 1.1473E−01 | 2.5948E−02 |

| Surface # | | | | |
|---|---|---|---|---|
| 7 | 8 | 9 | 10 | 11 |

| | 7 | 8 | 9 | 10 | 11 |
|---|---|---|---|---|---|
| k = | 1.3017E+00 | −2.1426E+00 | −8.4275E−01 | −1.0817E+01 | −3.2239E+00 |
| A4 = | −7.1040E−02 | −2.4886E−01 | 1.2873E−01 | −4.0235E−02 | −4.7833E−02 |
| A6 = | 5.8007E−02 | 2.1485E−01 | 3.5434E−02 | 7.3124E−03 | 2.3226E−03 |
| A8 = | −2.6669E−01 | 2.6326E−03 | 2.6700E−02 | 1.6760E−03 | 4.7641E−03 |
| A10 = | 3.7300E−01 | 8.8610E−03 | −3.3857E−03 | −3.7414E−03 | −3.2450E−03 |
| A12 = | | 4.9003E−03 | −2.9769E−03 | 1.4978E−03 | 9.0544E−04 |
| A14 = | | 4.4013E−03 | −1.0091E−03 | −2.3483E−04 | −1.2376E−04 |
| A16 = | | −2.1303E−02 | 3.6516E−04 | 1.3195E−05 | 6.8178E−06 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| f [mm] | 3.58 | (R3 − R4)/(R3 + R4) | 0.17 |
|---|---|---|---|
| Fno | 2.44 | (R5 + R6)/(R5 − R6) | 0.80 |
| HFOV [deg.] | 39.3 | (R7 − R8)/(R7 + R8) | −0.30 |
| V4/V5 | 0.42 | R9/R1 | 0.65 |

TABLE 14-continued (Embodiment 5)

| CT4/CT5 | 0.27 | f/f5 | 1.35 |
|---|---|---|---|
| (CT2 + CT4)/(T23 + T34) | 0.58 | f4/f2 | 0.27 |

TABLE 14-continued (Embodiment 5)

| | | | |
|---|---|---|---|
| T12/T23 | 0.04 | Yc51/f | 0.38 |
| T45/T34 | 0.09 | | |

Embodiment 6

Figure 6A:
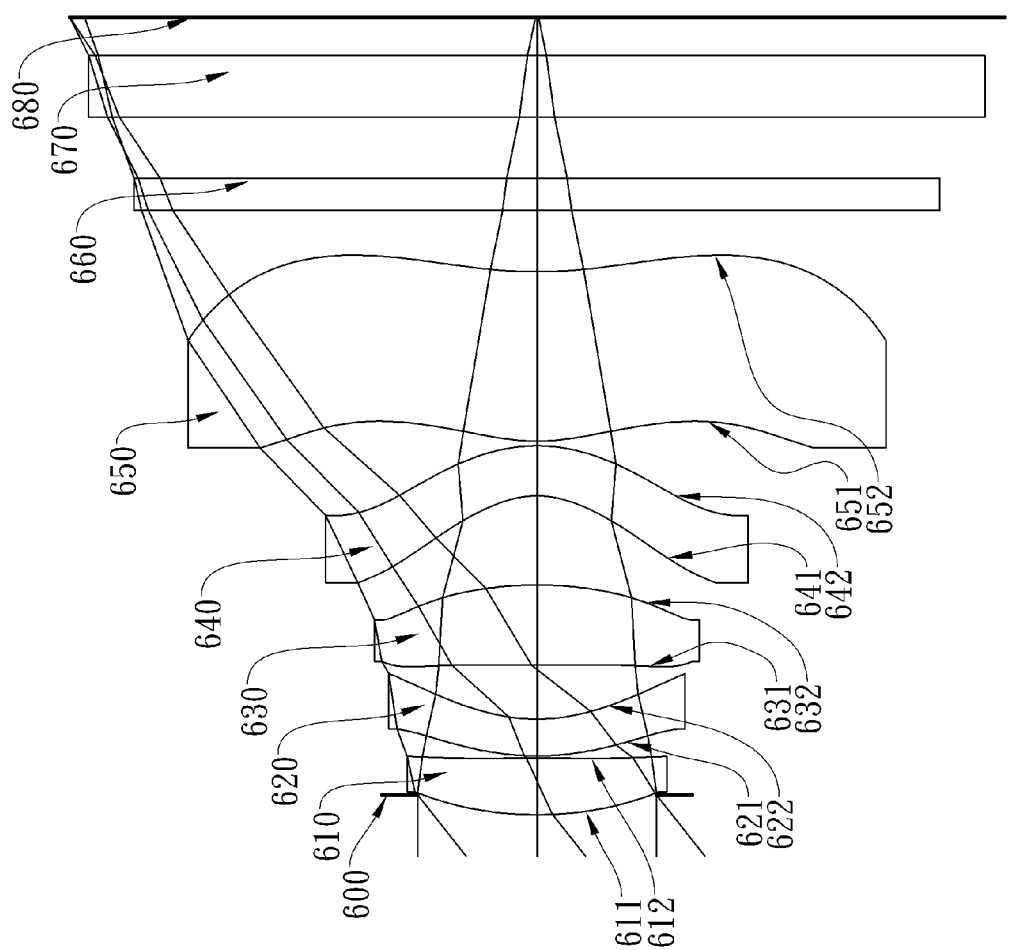
FIG. 6A shows an optical image capturing lens system in accordance with the sixth embodiment of the present disclosure.
Figure 6B:
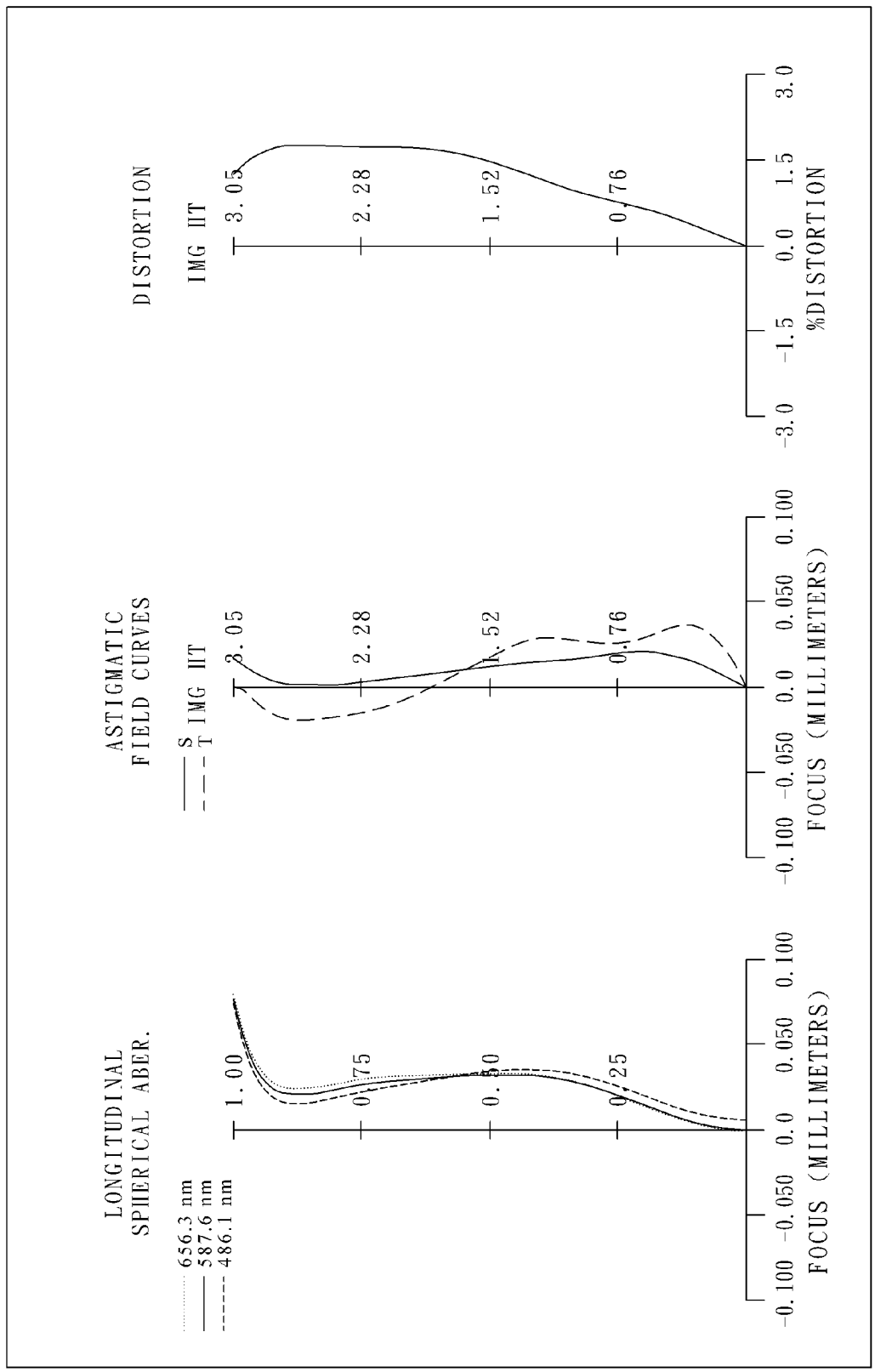
FIG. 6B shows the aberration curves of the sixth embodiment of the present disclosure.

FIG. 6A shows an optical image capturing lens system in accordance with the sixth embodiment of the present disclosure, and FIG. 6B shows the aberration curves of the sixth embodiment of the present disclosure. The optical image capturing lens system of the sixth embodiment of the present disclosure mainly comprises five lens elements with refractive power, in order from an object side to an image side:

a first lens element 610 made of plastic with positive refractive power having a convex object-side surface 611 and a convex image-side surface 612, and the object-side and image-side surfaces 611 and 612 thereof being aspheric;

a second lens element 620 made of plastic with negative refractive power having a convex object-side surface 621 and a concave image-side surface 622, and the object-side and image-side surfaces 621 and 622 thereof being aspheric;

a third lens element 630 made of plastic with positive refractive power having a convex object-side surface 631 and a convex image-side surface 632, and the object-side and image-side surfaces 631 and 632 thereof being aspheric;

a fourth lens element 640 made of plastic with negative refractive power having a concave object-side surface 641 and a convex image-side surface 642, the object-side and image-side surfaces 641 and 642 thereof being aspheric; and a fifth lens element 650 made of plastic with positive refractive power having a convex object-side surface 651 at a paraxial region and a concave image-side surface 652 at a paraxial region, the object-side and image-side surfaces 651 and 652 thereof being aspheric, and at least one inflection point is formed on both of the object-side surface 651 and the image-side surface 652;

wherein a stop 600, which is an aperture stop, is disposed between the imaged object and the first lens element 610; the optical image capturing lens system further comprises an IR-cut filter 660 and a cover glass 670 disposed sequentially between the fifth lens element 650 and an image plane 680, and the IR-cut filter 660 and a cover glass 670 are made of glass and have no influence on the focal length of the optical image capturing lens system.

The detailed optical data of the sixth embodiment is shown in TABLE 15, and the aspheric surface data is shown in TABLE 16, wherein the units of the curvature radius, the thickness and the focal length are expressed in mm, and HFOV is half of the maximal field of view.

TABLE 15

(Embodiment 6)

f = 3.79 mm, Fno = 2.43, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.130 | | | | |
| 2 | Lens 1 | 2.296 | ASP | 0.369 | Plastic | 1.544 | 55.9 | 3.85 |
| 3 | | −22.850 | ASP | 0.015 | | | | |
| 4 | Lens 2 | 1.673 | ASP | 0.240 | Plastic | 1.640 | 23.3 | −6.75 |
| 5 | | 1.138 | ASP | 0.352 | | | | |
| 6 | Lens 3 | 32.760 | ASP | 0.523 | Plastic | 1.544 | 55.9 | 4.32 |
| 7 | | −2.516 | ASP | 0.583 | | | | |
| 8 | Lens 4 | −0.580 | ASP | 0.326 | Plastic | 1.640 | 23.3 | −2.71 |
| 9 | | −1.061 | ASP | 0.030 | | | | |
| 10 | Lens 5 | 1.255 | ASP | 1.105 | Plastic | 1.544 | 55.9 | 3.40 |
| 11 | | 2.695 | ASP | 0.400 | | | | |
| 12 | IR-filter | Plano | | 0.210 | Glass | 1.517 | 64.2 | — |
| 13 | | Plano | | 0.400 | | | | |
| 14 | Cover-glass | Plano | | 0.400 | Glass | 1.517 | 64.2 | |
| 15 | | Plano | | 0.250 | | | | |
| 16 | Image | Plano | | — | | | | |

Note:
Reference Wavelength is 587.6 nm (d-line).

TABLE 16

Aspheric Coefficients

| | Surface # | | | | |
|---|---|---|---|---|---|
| | 2 | 3 | 4 | 5 | 6 |
| k = | 1.6350E+00 | 9.9000E+01 | −1.0833E+01 | −5.0808E+00 | 9.9000E+01 |
| A4 = | 5.9321E−03 | 8.1276E−02 | 9.3298E−02 | 7.7510E−02 | −5.4548E−02 |
| A6 = | −8.2136E−03 | 3.5592E−02 | −2.2318E−02 | 1.4119E−02 | −4.2690E−03 |
| A8 = | 1.2927E−02 | −6.1733E−02 | −9.0064E−02 | −4.1802E−01 | −1.9518E−02 |
| A10 = | −8.7402E−02 | −2.3238E−01 | 5.9638E−03 | 1.5187E+00 | −2.5664E−03 |
| A12 = | 2.0052E−01 | 3.0589E−01 | −2.3832E−02 | −2.9333E+00 | −8.9097E−03 |

TABLE 16-continued

| Aspheric Coefficients | | | | | |
|---|---|---|---|---|---|
| A14 = | −1.7285E−01 | −9.2200E−02 | −7.6091E−02 | 2.7144E+00 | 3.0856E−01 |
| A16 = | 9.4950E−06 | 9.9240E−06 | 1.1385E−01 | −9.5604E−01 | −2.1561E−01 |

| | Surface # | | | | |
|---|---|---|---|---|---|
| | 7 | 8 | 9 | 10 | 11 |
| k = | 3.5317E+00 | −3.3743E+00 | −7.8765E−01 | −1.3049E+01 | −1.2105E+01 |
| A4 = | 1.3753E−02 | −2.4349E−01 | 8.8400E−02 | −1.0402E−01 | −5.2856E−02 |
| A6 = | −1.6163E−01 | 2.4358E−01 | 2.2706E−03 | 5.3720E−02 | 1.3679E−02 |
| A8 = | 4.3468E−01 | −2.0294E−02 | 3.4706E−02 | −3.0916E−02 | −4.1391E−03 |
| A10 = | −6.8355E−01 | −3.7686E−02 | −6.4866E−04 | 1.0491E−02 | 5.5842E−04 |
| A12 = | 6.1773E−01 | 3.0533E−03 | −4.3675E−03 | −1.6075E−03 | 1.0930E−05 |
| A14 = | −2.3532E−01 | 2.0505E−02 | −1.7224E−03 | 8.1215E−05 | −1.1296E−05 |
| A16 = | 4.5270E−02 | −1.1370E−02 | 7.4275E−04 | 1.1731E−06 | 7.7650E−07 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

| (Embodiment 6) | | | |
|---|---|---|---|
| f [mm] | 3.79 | (R3 − R4)/(R3 + R4) | 0.19 |
| Fno | 2.43 | (R5 + R6)/(R5 − R6) | 0.86 |
| HFOV [deg.] | 38.4 | (R7 − R8)/(R7 + R8) | −0.29 |
| V4/V5 | 0.42 | R9/R1 | 0.55 |
| CT4/CT5 | 0.30 | f/f5 | 1.11 |
| (CT2 + CT4)/(T23 + T34) | 0.61 | f4/f2 | 0.40 |
| T12/T23 | 0.04 | Yc51/f | 0.27 |
| T45/T34 | 0.05 | | |

Embodiment 7

Figure 7A:
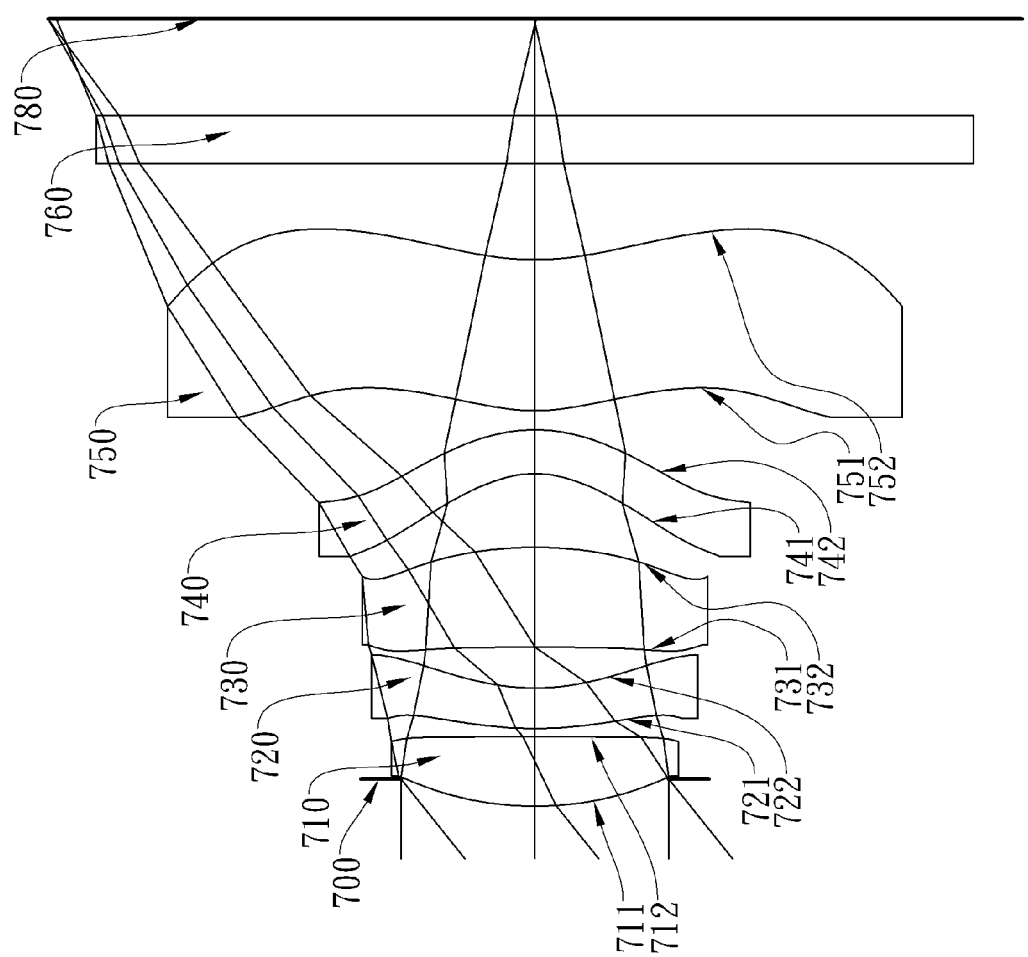
FIG. 7A shows an optical image capturing lens system in accordance with the seventh embodiment of the present disclosure.
Figure 7B:
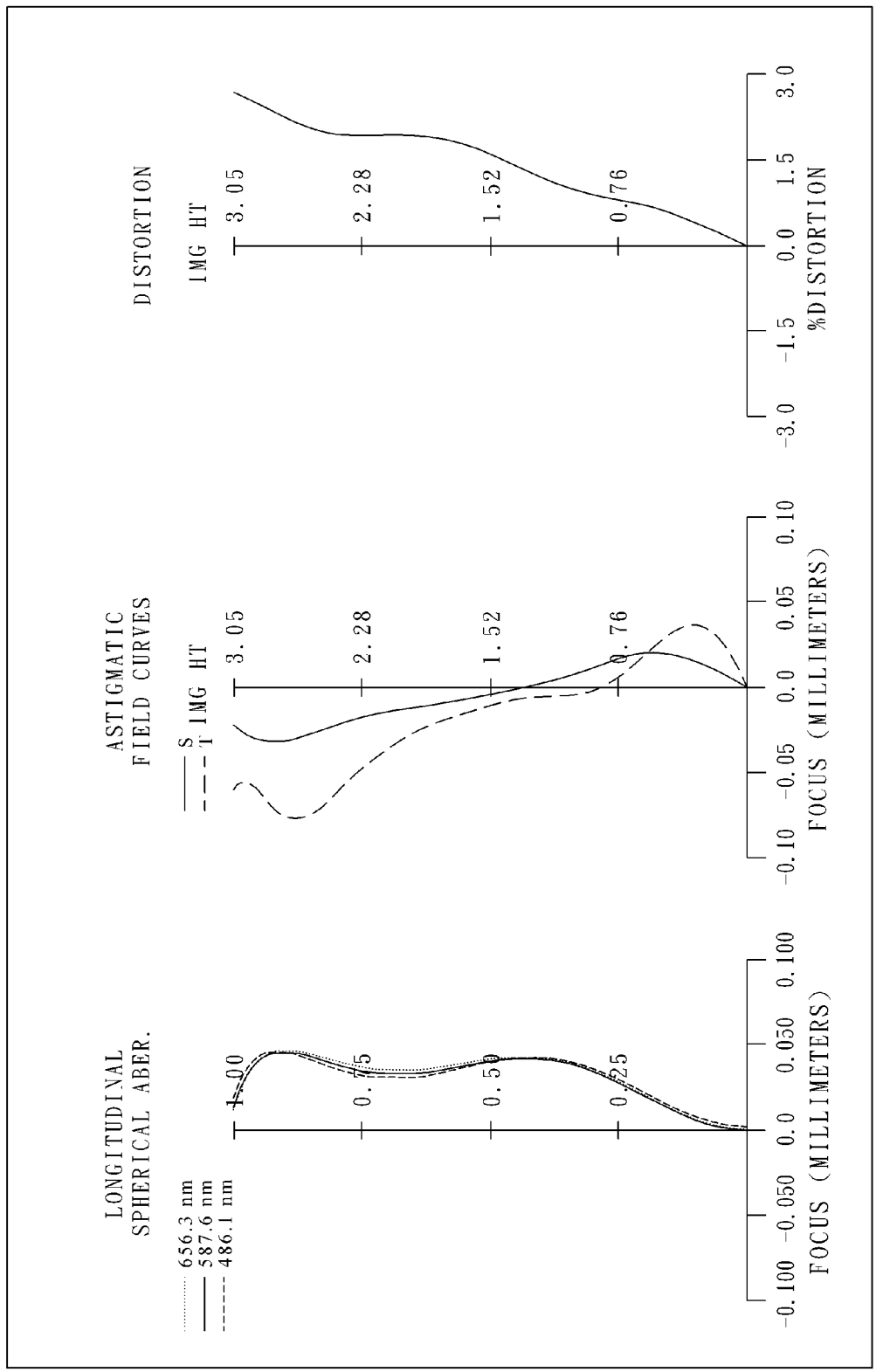
FIG. 7B shows the aberration curves of the seventh embodiment of the present disclosure.

FIG. 7A shows an optical image capturing lens system in accordance with the seventh embodiment of the present disclosure, and FIG. 7B shows the aberration curves of the seventh embodiment of the present disclosure. The optical image capturing lens system of the seventh embodiment of the present disclosure mainly comprises five lens elements with refractive power, in order from an object side to an image side:

a first lens element 710 made of plastic with positive refractive power having a convex object-side surface 711 and a convex image-side surface 712, and the object-side and image-side surfaces 711 and 712 thereof being aspheric;

a second lens element 720 made of plastic with negative refractive power having a convex object-side surface 721 and a concave image-side surface 722, and the object-side and image-side surfaces 721 and 722 thereof being aspheric;

a third lens element 730 made of plastic with positive refractive power having a concave object-side surface 731 and a convex image-side surface 732, and the object-side and image-side surfaces 731 and 732 thereof being aspheric;

a fourth lens element 740 made of plastic with negative refractive power having a concave object-side surface 741 and a convex image-side surface 742, the object-side and image-side surfaces 741 and 742 thereof being aspheric; and a fifth lens element 750 made of plastic with positive refractive power having a convex object-side surface 751 at a paraxial region and a concave image-side surface 752 at a paraxial region, the object-side and image-side surfaces 751 and 752 thereof being aspheric, and at least one inflection point is formed on both of the object-side surface 751 and the image-side surface 752;

wherein a stop 700, which is an aperture stop, is disposed between the imaged object and the first lens element 710; the optical image capturing lens system further comprises an IR-cut filter 760 disposed between the fifth lens element 750 and an image plane 780, and the IR-cut filter 760 is made of glass and has no influence on the focal length of the optical image capturing lens system.

The detailed optical data of the seventh embodiment is shown in TABLE 18, and the aspheric surface data is shown in TABLE 19, wherein the units of the curvature radius, the thickness and the focal length are expressed in mm, and HFOV is half of the maximal field of view.

TABLE 18

| (Embodiment 7) | | | | | | |
|---|---|---|---|---|---|---|
| f = 3.68 mm, Fno = 2.20, HFOV = 38.6 deg. | | | | | | |
| Surface # | Curvature Radius | | Thickness | Material | Index | Abbe # | Focal Length |
| 0 | Object | Plano | Infinity | | | | |
| 1 | Ape. Stop | Plano | −0.170 | | | | |
| 2 | Lens 1 | 2.012 | ASP | 0.436 | Plastic | 1.535 | 55.7 | 3.51 |
| 3 | | −25.469 | ASP | 0.050 | | | | |
| 4 | Lens 2 | 2.298 | ASP | 0.254 | Plastic | 1.632 | 23.4 | −6.18 |
| 5 | | 1.385 | ASP | 0.255 | | | | |
| 6 | Lens 3 | −76.015 | ASP | 0.626 | Plastic | 1.544 | 55.9 | 4.78 |
| 7 | | −2.521 | ASP | 0.462 | | | | |

TABLE 18-continued (Embodiment 7)

f = 3.68 mm, Fno = 2.20, HFOV = 38.6 deg.

| Surface # | | Curvature Radius | | Thickness | Material | Index | Abbe # | Focal Length |
|---|---|---|---|---|---|---|---|---|
| 8 | Lens 4 | −0.639 | ASP | 0.274 | Plastic | 1.632 | 23.4 | −3.68 |
| 9 | | −1.026 | ASP | 0.120 | | | | |
| 10 | Lens 5 | 1.197 | ASP | 0.946 | Plastic | 1.530 | 55.8 | 4.76 |
| 11 | | 1.654 | ASP | 0.600 | | | | |
| 12 | IR-filter | Plano | | 0.300 | Glass | 1.517 | 64.2 | — |
| 13 | | Plano | | 0.607 | | | | |
| 14 | Image | Plano | | — | | | | |

Note:
Reference Wavelength is 587.6 nm (d-line).

TABLE 19

Aspheric Coefficients

| | Surface # | | | | |
|---|---|---|---|---|---|
| | 2 | 3 | 4 | 5 | 6 |
| k = | 1.0985E+00 | −2.0000E+01 | −2.2040E+01 | −6.8049E+00 | 4.9998E+00 |
| A4 = | −1.1948E−02 | 2.3013E−02 | 3.4069E−02 | 5.6952E−02 | −5.6174E−02 |
| A6 = | 6.4180E−03 | 3.1108E−02 | −3.6851E−02 | −1.7033E−02 | 1.0565E−04 |
| A8 = | 2.6365E−03 | −2.4973E−02 | −8.1375E−02 | −4.3544E−01 | 1.3478E−02 |
| A10 = | −1.0066E−01 | −2.1280E−01 | −8.0588E−02 | 1.5359E+00 | −2.0089E−02 |
| A12 = | 2.0893E−01 | 2.6725E−01 | −5.2836E−02 | −2.9469E+00 | −3.4103E−02 |
| A14 = | −2.3061E−01 | −2.2442E−01 | 1.7242E−02 | 2.6910E+00 | 3.0073E−01 |
| A16 = | 7.1642E−02 | 7.2963E−02 | 3.1773E−03 | −9.1639E−01 | −1.9693E−01 |

| | Surface # | | | | |
|---|---|---|---|---|---|
| | 7 | 8 | 9 | 10 | 11 |
| k = | 3.4239E+00 | −3.7767E+00 | −7.9012E−01 | −1.1200E+01 | −8.7374E+00 |
| A4 = | 1.7321E−02 | −2.4247E−01 | 1.0547E−01 | −1.0430E−01 | −4.9839E−02 |
| A6 = | −1.4315E−01 | 2.6422E−01 | 8.7983E−03 | 5.1734E−02 | 1.2179E−02 |
| A8 = | 4.2555E−01 | −4.6064E−02 | 3.4007E−02 | −3.0814E−02 | −3.9452E−03 |
| A10 = | −6.7529E−01 | −3.9482E−02 | −2.6062E−03 | 1.0585E−02 | 5.7216E−04 |
| A12 = | 6.3110E−01 | 1.4348E−02 | −4.9075E−03 | −1.5848E−03 | 5.8795E−06 |
| A14 = | −2.2866E−01 | 2.4177E−02 | −1.6316E−03 | 7.8519E−05 | −1.1856E−05 |
| A16 = | 2.8000E−02 | −1.6301E−02 | 7.6040E−04 | 2.7386E−07 | 1.0125E−06 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| f [mm] | 3.68 | (R3 − R4)/(R3 + R4) | 0.25 |
|---|---|---|---|
| Fno | 2.20 | (R5 + R6)/(R5 − R6) | 1.07 |
| HFOV [deg.] | 38.6 | (R7 − R8)/(R7 + R8) | −0.23 |
| V4/V5 | 0.42 | R9/R1 | 0.59 |
| CT4/CT5 | 0.29 | f/f5 | 0.77 |
| (CT2 + CT4)/(T23 + T34) | 0.74 | f4/f2 | 0.60 |
| T12/T23 | 0.20 | Yc51/f | 0.28 |
| T45/T34 | 0.26 | | |

Embodiment 8

Figure 8A:
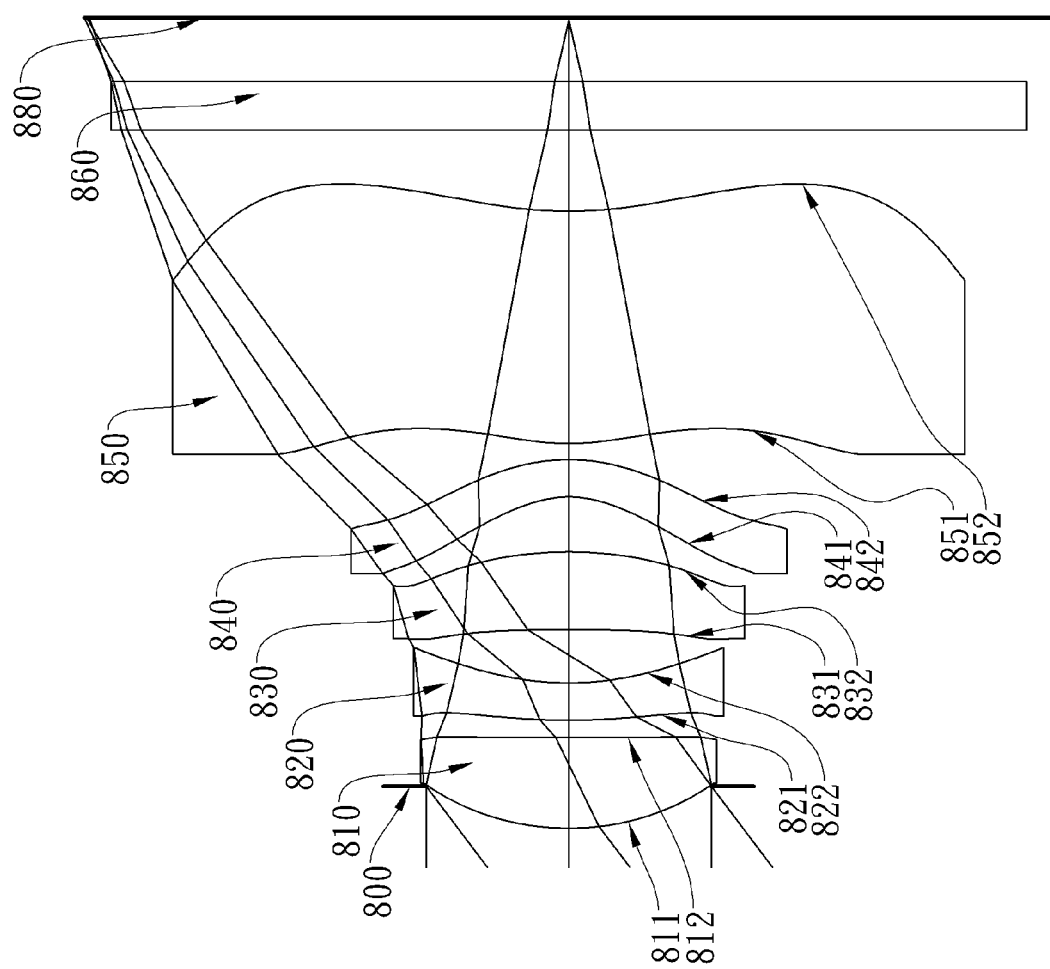
FIG. 8A shows an optical image capturing lens system in accordance with the eighth embodiment of the present disclosure.
Figure 8B:
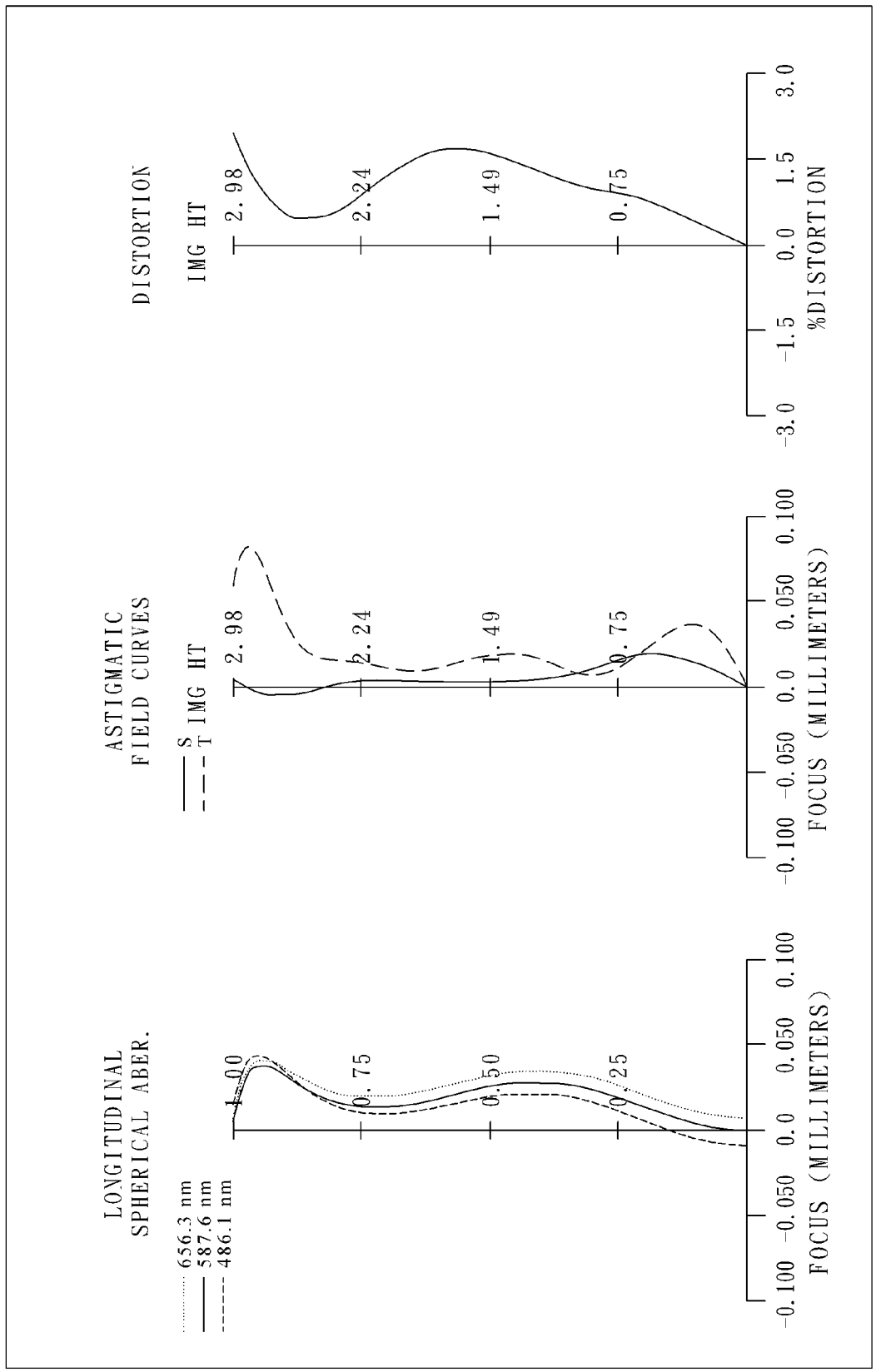
FIG. 8B shows the aberration curves of the eighth embodiment of the present disclosure.

FIG. 8A shows an optical image capturing lens system in accordance with the eighth embodiment of the present disclosure, and FIG. 8B shows the aberration curves of the eighth embodiment of the present disclosure. The optical image capturing lens system of the eighth embodiment of the present disclosure mainly comprises five lens elements with refractive power, in order from an object side to an image side:

a first lens element 810 made of plastic with positive refractive power having a convex object-side surface 811 and a concave image-side surface 812, and the object-side and image-side surfaces 811 and 812 thereof being aspheric;

a second lens element 820 made of plastic with negative refractive power having a convex object-side surface 821 and a concave image-side surface 822, and the object-side and image-side surfaces 821 and 822 thereof being aspheric;

a third lens element 830 made of plastic with positive refractive power having a concave object-side surface 831 and a convex image-side surface 832, and the object-side and image-side surfaces 831 and 832 thereof being aspheric;

a fourth lens element 840 made of plastic with negative refractive power having a concave object-side surface 841 and a convex image-side surface 842, the object-side and image-side surfaces 841 and 842 thereof being aspheric; and a fifth lens element 850 made of plastic with positive refractive power having a convex object-side surface 851 at a paraxial region and a concave image-side surface 852 at a paraxial region, the object-side and image-side surfaces 851 and 852 thereof being aspheric, and at least one inflection point is formed on both of the object-side surface 851 and the image-side surface 852;

wherein a stop 800, which is an aperture stop, is disposed between the imaged object and the first lens element 810; the optical image capturing lens system further comprises an IR-cut filter 860 disposed between the fifth lens element 850 and an image plane 880, and the IR-cut filter 860 is made of glass and has no influence on the focal length of the optical image capturing lens system.

The detailed optical data of the eighth embodiment is shown in TABLE 21, and the aspheric surface data is shown in TABLE 22, wherein the units of the curvature radius, the thickness and the focal length are expressed in mm, and HFOV is half of the maximal field of view.

TABLE 21

(Embodiment 8)

f = 3.87 mm, Fno = 2.20, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.259 | | | | |
| 2 | Lens 1 | 1.617 | ASP | 0.559 | Plastic | 1.535 | 55.7 | 3.04 |
| 3 | | 226.988 | ASP | 0.107 | | | | |
| 4 | Lens 2 | 3.681 | ASP | 0.230 | Plastic | 1.650 | 21.4 | −5.30 |
| 5 | | 1.735 | ASP | 0.328 | | | | |
| 6 | Lens 3 | −16.403 | ASP | 0.480 | Plastic | 1.530 | 55.8 | 5.37 |
| 7 | | −2.449 | ASP | 0.340 | | | | |
| 8 | Lens 4 | −0.636 | ASP | 0.230 | Plastic | 1.543 | 56.5 | −3.03 |
| 9 | | −1.168 | ASP | 0.099 | | | | |
| 10 | Lens 5 | 1.389 | ASP | 1.432 | Plastic | 1.530 | 55.8 | 4.21 |
| 11 | | 2.366 | ASP | 0.500 | | | | |
| 12 | IR-filter | Plano | | 0.300 | Glass | 1.517 | 64.2 | — |
| 13 | | Plano | | 0.393 | | | | |
| 14 | Image | Plano | | — | | | | |

Note:
Reference Wavelength is 587.6 nm (d-line).

TABLE 22

Aspheric Coefficients

| | Surface # | | | | |
|---|---|---|---|---|---|
| | 2 | 3 | 4 | 5 | 6 |
| k = | 8.8082E−01 | −7.5000E+00 | −4.9085E+01 | −9.0858E+00 | 5.0000E+00 |
| A4 = | −1.5535E−02 | 1.1586E−02 | −1.7296E−02 | 6.8448E−02 | −7.2397E−02 |
| A6 = | −1.1634E−02 | 2.9889E−03 | 3.3097E−02 | 1.4822E−02 | −1.1351E−02 |
| A8 = | 2.2660E−02 | 9.0217E−02 | −6.5563E−02 | −3.6757E−01 | −3.3709E−04 |
| A10 = | −9.9282E−02 | −2.8496E−01 | −4.4848E−02 | 1.4964E+00 | −6.6748E−03 |
| A12 = | 2.0936E−01 | 2.7221E−01 | −5.5306E−02 | −2.9482E+00 | −3.5522E−02 |
| A14 = | −2.2924E−01 | −2.2455E−01 | 2.0189E−02 | 2.6920E+00 | 3.0035E−01 |
| A16 = | 7.1675E−02 | 7.2529E−02 | 3.5168E−03 | −9.1651E−01 | −1.9621E−01 |

| | Surface # | | | | |
|---|---|---|---|---|---|
| | 7 | 8 | 9 | 10 | 11 |
| k = | 3.3809E+00 | −3.9779E+00 | −7.0568E−01 | −1.8711E+01 | −7.6750E+00 |
| A4 = | 2.3011E−02 | −1.9799E−01 | 7.9182E−02 | −1.1917E−01 | −4.7231E−02 |
| A6 = | −1.5023E−01 | 2.4576E−01 | 1.9110E−02 | 5.9979E−02 | 1.3998E−02 |
| A8 = | 4.4313E−01 | −4.7164E−02 | 3.2960E−02 | −3.0297E−02 | −4.3665E−03 |
| A10 = | −6.9205E−01 | −3.2774E−02 | −4.5132E−03 | 1.0395E−02 | 5.6352E−04 |

TABLE 22-continued

Aspheric Coefficients

| A12 = | 6.3297E−01 | 8.5599E−03 | −5.4231E−03 | −1.6425E−03 | 9.8797E−06 |
|---|---|---|---|---|---|
| A14 = | −2.2842E−01 | 2.4764E−02 | −1.5136E−03 | 7.5671E−05 | −1.1040E−05 |
| A16 = | 2.7817E−02 | −1.6562E−02 | 7.8275E−04 | 2.5050E−06 | 8.8446E−07 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f [mm] | 3.87 | (R3 − R4)/(R3 + R4) | 0.36 |
|---|---|---|---|
| Fno | 2.20 | (R5 + R6)/(R5 − R6) | 1.35 |
| HFOV [deg.] | 37.0 | (R7 − R8)/(R7 + R8) | −0.30 |
| V4/V5 | 1.01 | R9/R1 | 0.86 |
| CT4/CT5 | 0.16 | f/f5 | 0.92 |
| (CT2 + CT4)/(T23 + T34) | 0.69 | f4/f2 | 0.57 |
| T12/T23 | 0.33 | Yc51/f | 0.24 |
| T45/T34 | 0.29 | | |

Embodiment 9

Figure 9A:
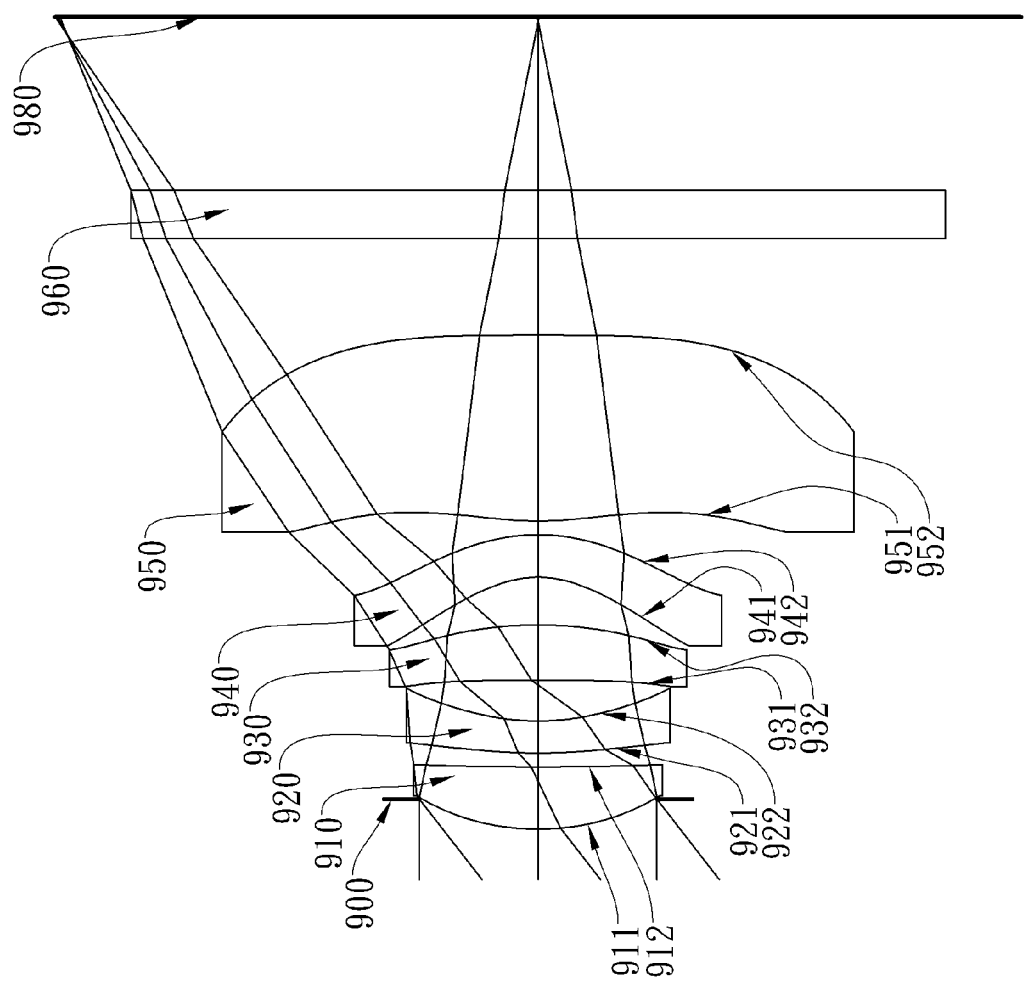
FIG. 9A shows an optical image capturing lens system in accordance with the ninth embodiment of the present disclosure.
Figure 9B:
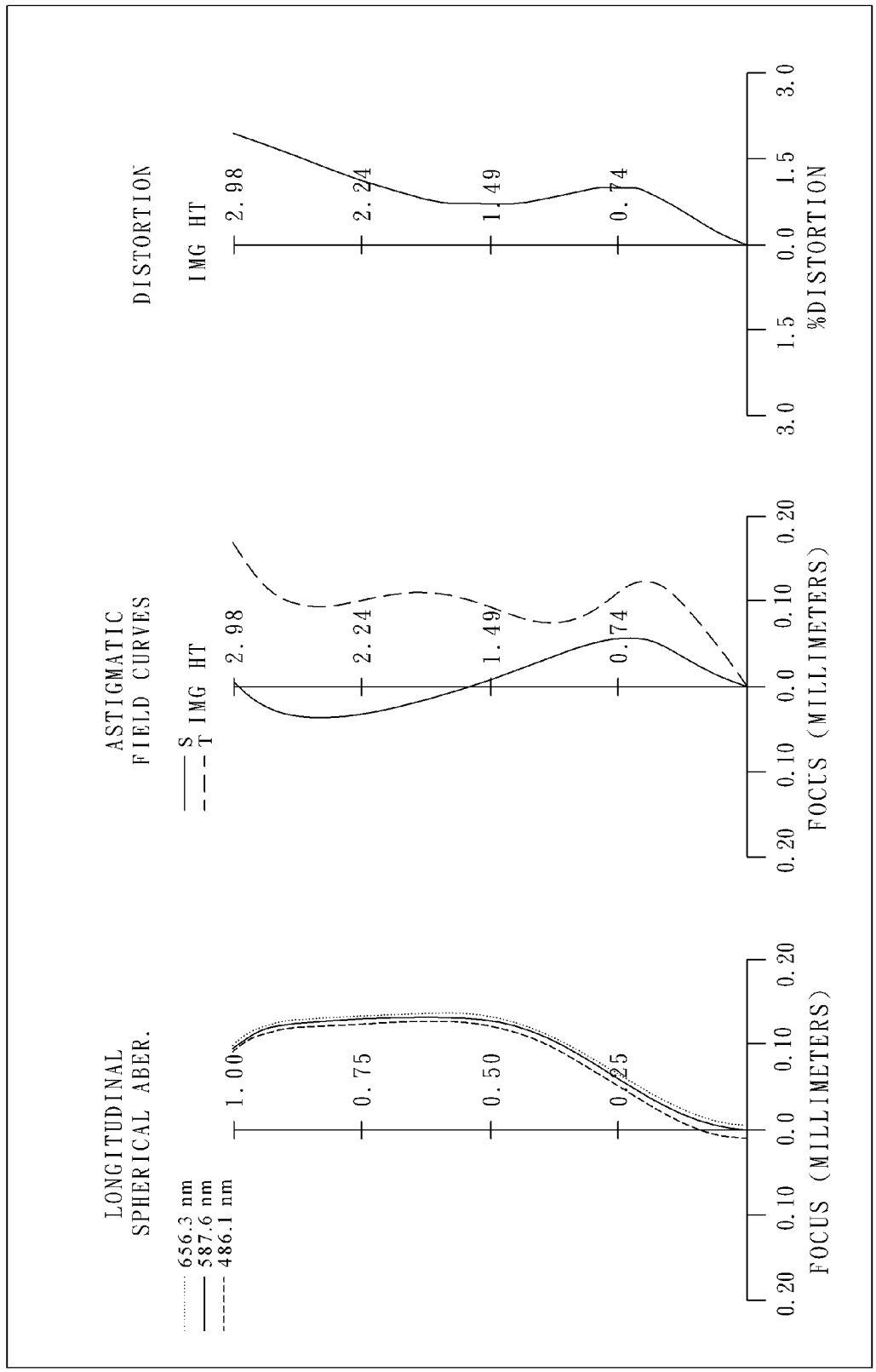
FIG. 9B shows the aberration curves of the ninth embodiment of the present disclosure.

FIG. 9A shows an optical image capturing lens system in accordance with the ninth embodiment of the present disclosure, and FIG. 9B shows the aberration curves of the ninth embodiment of the present disclosure. The optical image capturing lens system of the ninth embodiment of the present disclosure mainly comprises five lens elements with refractive power, in order from an object side to an image side:

a first lens element 910 made of plastic with positive refractive power having a convex object-side surface 911 and a concave image-side surface 912, and the object-side and image-side surfaces 911 and 912 thereof being aspheric;

a second lens element 920 made of plastic with negative refractive power having a convex object-side surface 921 and a concave image-side surface 922, and the object-side and image-side surfaces 921 and 922 thereof being aspheric;

a third lens element 930 made of plastic with positive refractive power having a concave object-side surface 931 and a convex image-side surface 932, and the object-side and image-side surfaces 931 and 932 thereof being aspheric;

a fourth lens element 940 made of plastic with negative refractive power having a concave object-side surface 941 and a convex image-side surface 942, the object-side and image-side surfaces 941 and 942 thereof being aspheric; and a fifth lens element 950 made of plastic with positive refractive power having a convex object-side surface 951 at a paraxial region and a convex image-side surface 952 at a paraxial region, the object-side and image-side surfaces 951 and 952 thereof being aspheric, and at least one inflection point is formed on both of the object-side surface 951 and the image-side surface 952;

wherein a stop 900, which is an aperture stop, is disposed between the imaged object and the first lens element 910; the optical image capturing lens system further comprises an IR-cut filter 960 disposed between the fifth lens element 950 and an image plane 980, and the IR-cut filter 960 is made of glass and has no influence on the focal length of the optical image capturing lens system.

The detailed optical data of the ninth embodiment is shown in TABLE 24, and the aspheric surface data is shown in TABLE 25, wherein the units of the curvature radius, the thickness and the focal length are expressed in mm, and HFOV is half of the maximal field of view.

TABLE 24

(Embodiment 9)

f = 3.69 mm, Fno = 2.50, HFOV = 37.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.187 | | | | |
| 2 | Lens 1 | 1.520 | ASP | 0.387 | Plastic | 1.543 | 56.5 | 2.94 |
| 3 | | 29.242 | ASP | 0.085 | | | | |
| 4 | Lens 2 | 3.037 | ASP | 0.200 | Plastic | 1.634 | 23.8 | −4.52 |
| 5 | | 1.437 | ASP | 0.253 | | | | |
| 6 | Lens 3 | −60.133 | ASP | 0.344 | Plastic | 1.530 | 55.8 | 4.88 |
| 7 | | −2.482 | ASP | 0.297 | | | | |
| 8 | Lens 4 | −0.638 | ASP | 0.264 | Plastic | 1.543 | 56.5 | −3.07 |
| 9 | | −1.185 | ASP | 0.085 | | | | |
| 10 | Lens 5 | 1.904 | ASP | 1.154 | Plastic | 1.535 | 55.7 | 3.55 |
| 11 | | −1000.000 | ASP | 0.600 | | | | |
| 12 | IR-filter | Plano | | 0.300 | Glass | 1.517 | 64.2 | — |
| 13 | | Plano | | 1.079 | | | | |
| 14 | Image | Plano | | — | | | | |

Note:
Reference Wavelength is 587.6 nm (d-line).

TABLE 25

Aspheric Coefficients

| Surface # | 2 | 3 | 4 | 5 | 6 |
|---|---|---|---|---|---|
| k = | 8.4942E−01 | 5.0000E+00 | −5.1195E+01 | −7.6806E+00 | 5.0000E+00 |
| A4 = | −1.4163E−02 | 9.7591E−03 | −1.5521E−02 | 7.4081E−02 | −7.4291E−02 |
| A6 = | −1.1809E−02 | 1.5290E−02 | 4.9094E−02 | 2.3565E−02 | 3.5861E−03 |
| A8 = | 2.2841E−02 | 1.0224E−01 | −3.6905E−02 | −3.5074E−01 | 2.6136E−03 |
| A10 = | −1.1506E−01 | −3.0889E−01 | −1.6298E−02 | 1.5375E+00 | −4.5930E−02 |
| A12 = | 2.0941E−01 | 2.8111E−01 | −4.0517E−02 | −2.9438E+00 | −4.0887E−02 |
| A14 = | −2.2684E−01 | −2.2442E−01 | 2.1050E−02 | 2.6926E+00 | 2.9846E−01 |
| A16 = | 7.1392E−02 | 7.2363E−02 | 3.3764E−03 | −9.1648E−01 | −1.9688E−01 |

| Surface # | 7 | 8 | 9 | 10 | 11 |
|---|---|---|---|---|---|
| k = | 3.1219E+00 | −3.3345E+00 | −6.7520E−01 | −3.7148E+01 | −1.4950E+01 |
| A4 = | 3.7833E−02 | −2.1195E−01 | 7.8531E−02 | −1.1881E−01 | −5.9456E−02 |
| A6 = | −1.3905E−01 | 2.5214E−01 | 1.4509E−02 | 6.0938E−02 | 1.5190E−02 |
| A8 = | 4.5473E−01 | −4.2494E−02 | 3.1277E−02 | −2.9963E−02 | −4.2929E−03 |
| A10 = | −6.7082E−01 | −3.8403E−02 | −4.7280E−03 | 1.0496E−02 | 5.3201E−04 |
| A12 = | 6.2922E−01 | 8.5310E−03 | −4.9970E−03 | −1.6264E−03 | 6.0534E−06 |
| A14 = | −2.2794E−01 | 2.4778E−02 | −7.8422E−04 | 7.2885E−05 | −1.1820E−05 |
| A16 = | 2.7383E−02 | −1.5273E−02 | 1.5330E−03 | −2.6697E−06 | 7.9535E−07 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

(Embodiment 9)

| f [mm] | 3.69 | (R3 − R4)/(R3 + R4) | 0.36 |
|---|---|---|---|
| Fno | 2.50 | (R5 + R6)/(R5 − R6) | 1.09 |
| HFOV [deg.] | 37.8 | (R7 − R8)/(R7 + R8) | −0.30 |
| V4/V5 | 1.01 | R9/R1 | 1.25 |
| CT4/CT5 | 0.23 | f/f5 | 1.04 |
| (CT2 + CT4)/(T23 + T34) | 0.84 | f4/f2 | 0.68 |
| T12/T23 | 0.34 | Yc51/f | 0.21 |
| T45/T34 | 0.29 | | |

Embodiment 10

Figure 10A:
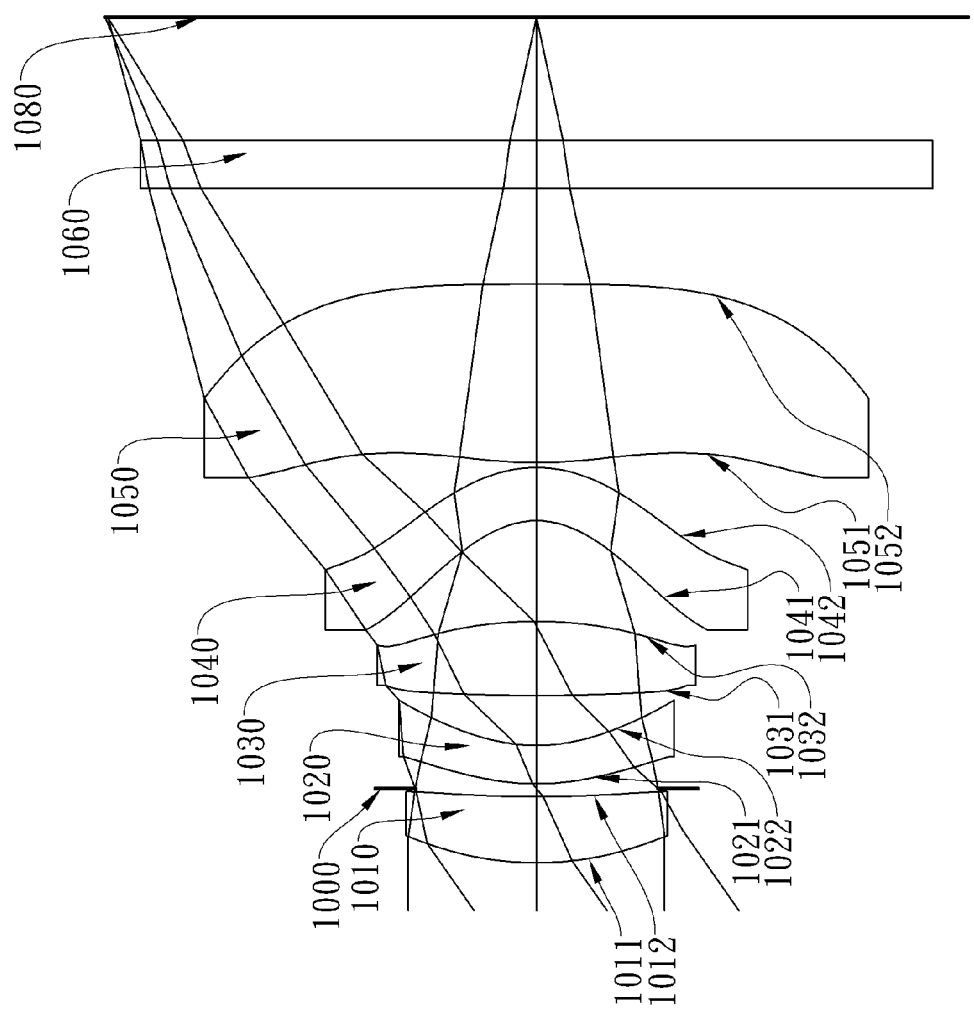
FIG. 10A shows an optical image capturing lens system in accordance with the tenth embodiment of the present disclosure.
Figure 10B:
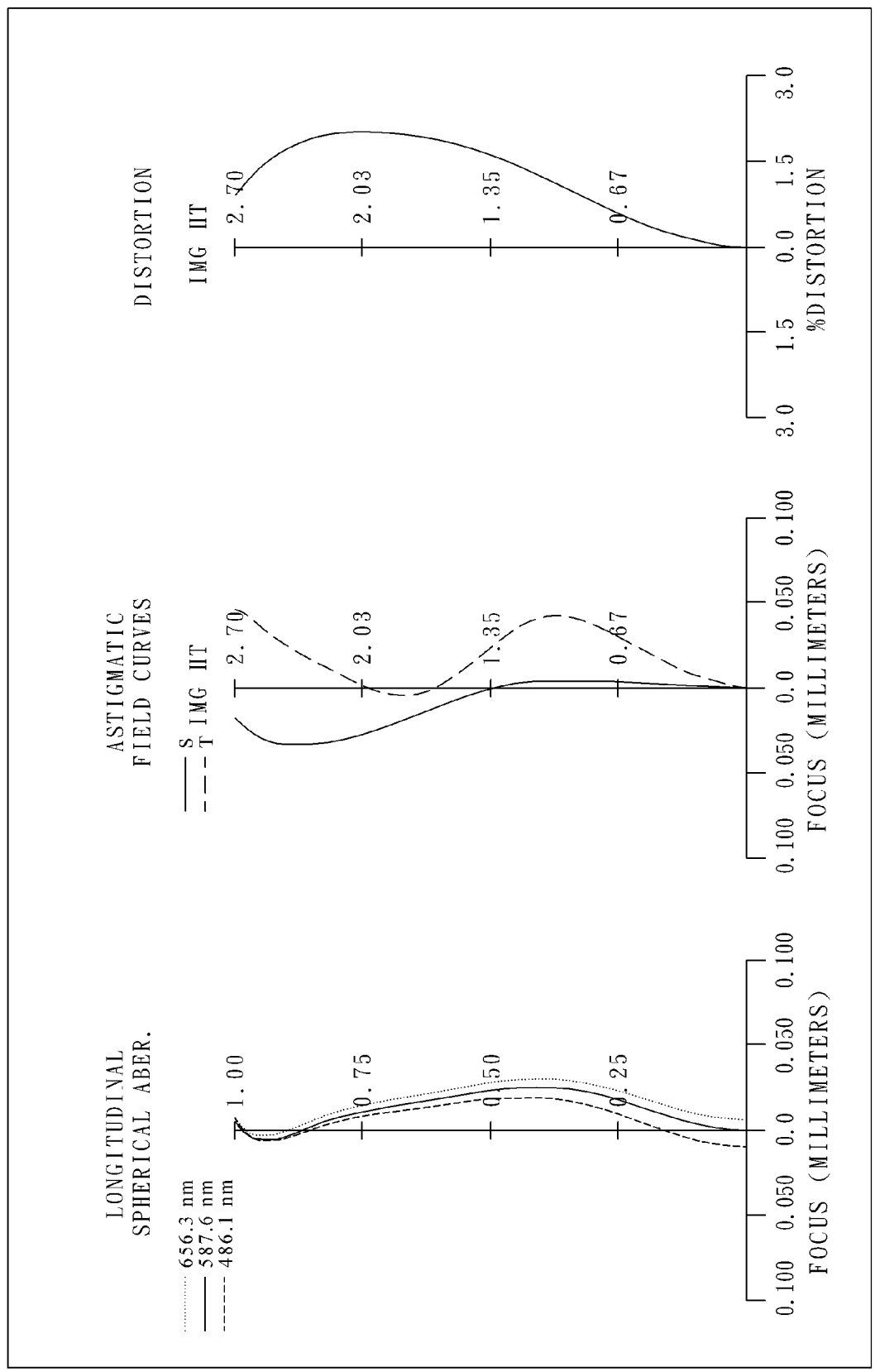
FIG. 10B shows the aberration curves of the tenth embodiment of the present disclosure.

FIG. 10A shows an optical image capturing lens system in accordance with the tenth embodiment of the present disclosure, and FIG. 10B shows the aberration curves of the tenth embodiment of the present disclosure. The optical image capturing lens system of the tenth embodiment of the present disclosure mainly comprises five lens elements with refractive power, in order from an object side to an image side:

a first lens element 1010 made of plastic with positive refractive power having a convex object-side surface 1011 and a concave image-side surface 1012, and the object-side and image-side surfaces 1011 and 1012 thereof being aspheric;

a second lens element 1020 made of plastic with negative refractive power having a convex object-side surface 1021 and a concave image-side surface 1022, and the object-side and image-side surfaces 1021 and 1022 thereof being aspheric;

a third lens element 1030 made of plastic with positive refractive power having a convex object-side surface 1031 and a convex image-side surface 1032, and the object-side and image-side surfaces 1031 and 1032 thereof being aspheric;

a fourth lens element 1040 made of plastic with negative refractive power having a concave object-side surface 1041 and a convex image-side surface 1042, the object-side and image-side surfaces 1041 and 1042 thereof being aspheric; and a fifth lens element 1050 made of plastic with positive refractive power having a convex object-side surface 1051 at a paraxial region and a convex image-side surface 1052 at a paraxial region, the object-side and image-side surfaces 1051 and 1052 thereof being aspheric, and at least one inflection point is formed on both of the object-side surface 1051 and the image-side surface 1052;

wherein a stop 1000, which is an aperture stop, is disposed between the first lens element 1010 and the second lens element 1020; the optical image capturing lens system further comprises an IR-cut filter 1060 disposed between the fifth lens element 1050 and an image plane 1080, and the IR-cut filter 1060 is made of glass and has no influence on the focal length of the optical image capturing lens system.

The detailed optical data of the ninth embodiment is shown in TABLE 27, and the aspheric surface data is shown in TABLE 28, wherein the units of the curvature radius, the thickness and the focal length are expressed in mm, and HFOV is half of the maximal field of view.

TABLE 27

(Embodiment 10)

f = 3.81 mm, Fno = 2.40, HFOV = 35.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.988 | ASP | 0.413 | Plastic | 1.572 | 58.6 | 4.76 |
| 2 | | 6.804 | ASP | 0.052 | | | | |
| 3 | Ape. Stop | Plano | | 0.030 | | | | |
| 4 | Lens 2 | 1.498 | ASP | 0.240 | Plastic | 1.640 | 23.3 | −8.12 |
| 5 | | 1.090 | ASP | 0.312 | | | | |
| 6 | Lens 3 | 9.644 | ASP | 0.465 | Plastic | 1.572 | 58.6 | 3.67 |
| 7 | | −2.632 | ASP | 0.631 | | | | |
| 8 | Lens 4 | −0.508 | ASP | 0.333 | Plastic | 1.640 | 23.3 | −3.73 |
| 9 | | −0.811 | ASP | 0.030 | | | | |
| 10 | Lens 5 | 2.441 | ASP | 1.117 | Plastic | 1.535 | 55.7 | 4.45 |
| 11 | | −79.758 | ASP | 0.600 | | | | |
| 12 | IR-filter | Plano | | 0.300 | Glass | 1.517 | 64.2 | — |
| 13 | | Plano | | 0.774 | | | | |
| 14 | Image | Plano | | — | | | | |

Note:
Reference Wavelength is 587.6 nm (d-line).

TABLE 28

Aspheric Coefficients

| | Surface # | | | | |
|---|---|---|---|---|---|
| | 1 | 2 | 4 | 5 | 6 |
| k = | 7.9476E−01 | 0.0000E+00 | −8.1799E+00 | −3.8540E+00 | 3.0000E+00 |
| A4 = | −6.5216E−03 | −4.5570E−02 | 4.0284E−02 | 6.6043E−02 | −2.6383E−02 |
| A6 = | −8.7940E−03 | 7.8552E−02 | −5.0720E−02 | 2.0801E−02 | −5.0133E−03 |
| A8 = | −2.9802E−02 | −4.3003E−02 | 1.5812E−02 | −3.9922E−01 | 6.4172E−02 |
| A10 = | −6.3542E−02 | −1.8949E−01 | 8.7300E−02 | 1.5393E+00 | −2.8438E−02 |
| A12 = | 1.8680E−01 | 2.0324E−01 | −1.0255E−01 | −2.9222E+00 | −1.5467E−01 |
| A14 = | −2.1139E−01 | −1.3683E−01 | −2.5787E−01 | 2.7166E+00 | 3.9717E−01 |
| A16 = | 7.1408E−02 | 9.4834E−02 | 3.0685E−01 | −9.8032E−01 | −2.0493E−01 |

| | Surface # | | | | |
|---|---|---|---|---|---|
| | 7 | 8 | 9 | 10 | 11 |
| k = | 2.8026E+00 | −1.8353E+00 | −7.6892E−01 | −2.5918E+01 | −1.0000E+00 |
| A4 = | 1.2618E−02 | −2.4054E−01 | 1.2256E−01 | −1.0017E−01 | −4.7422E−02 |
| A6 = | −1.3318E−01 | 2.7880E−01 | 3.9438E−02 | 5.5018E−02 | 8.4223E−03 |
| A8 = | 4.5270E−01 | −1.0997E−02 | 3.2783E−02 | −3.0403E−02 | −2.6272E−03 |
| A10 = | −6.8780E−01 | −3.2387E−02 | −1.6683E−03 | 1.0473E−02 | 4.5083E−04 |
| A12 = | 6.1499E−01 | 1.3339E−03 | −4.9853E−03 | −1.6273E−03 | −2.3190E−05 |
| A14 = | −2.2653E−01 | 1.8217E−02 | −1.6810E−03 | 7.4990E−05 | −1.1365E−05 |
| A16 = | 4.7330E−02 | −1.5173E−02 | 5.7218E−04 | 1.8567E−06 | 1.8555E−06 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 29.

TABLE 29

(Embodiment 10)

| f [mm] | 3.81 | (R3 − R4)/(R3 + R4) | 0.16 |
|---|---|---|---|
| Fno | 2.40 | (R5 + R6)/(R5 − R6) | 0.57 |
| HFOV [deg.] | 35.0 | (R7 − R8)/(R7 + R8) | −0.23 |
| V4/V5 | 0.42 | R9/R1 | 1.23 |
| CT4/CT5 | 0.30 | f/f5 | 0.86 |
| (CT2 + CT4)/(T23 + T34) | 0.61 | f4/f2 | 0.46 |

TABLE 29-continued (Embodiment 10)

| T12/T23 | 0.26 | Yc51/f | 0.23 |
|---|---|---|---|
| T45/T34 | 0.05 | | |

It is to be noted that TABLES 1-29 show different data of the different embodiments; however, the data of the different embodiments are obtained from experiments. Therefore, any optical image capturing lens system of the same structure is considered to be within the scope of the present disclosure even if it uses different data. The embodiments depicted above and the appended drawings are exemplary and are not intended to limit the scope of the present disclosure.

What is claimed is:

1. An optical image capturing lens system, in order from an object side to an image side comprising five lens elements with refractive power:
   a first lens element with positive refractive power having a convex object-side surface;
   a second lens element with negative refractive power having a convex object-side surface and a concave image-side surface;
   a third lens element with refractive power;
   a fourth lens element with negative refractive power having a concave object-side surface and a convex image-side surface, and both of the object-side and image-side surfaces being aspheric; and
   a fifth lens element with positive refractive power having a convex object-side surface at a paraxial region, both of the object-side and image-side surfaces being aspheric, and at least one inflection point is formed on at least one of the object-side surface and the image-side surface thereof;
   wherein the lens elements with refractive power in the optical image capturing lens system are the first lens element, the second lens element, the third lens element, the fourth lens element, and the fifth lens element;
   wherein a focal length of the optical image capturing lens system is f, a focal length of the fifth lens element is f5, a curvature radius of the object-side surface of the fifth lens element is R9, a curvature radius of the object-side surface of the first lens element is R1, an Abbe number of the fourth lens element is V4, an Abbe number of the fifth lens element is V5, and they satisfy the following relations:

$0.55 < f/f5 < 2.0$;

$0 < R9/R1 < 1.7$; and $0.2 < V4/V5 < 0.6$.

2. The optical image capturing lens system according to claim 1, wherein the third lens element has positive refractive power, the object-side surfaces and image-side surfaces of the first lens element, the second lens element, the third lens element, the fourth lens element, and the fifth lens element are aspheric; and the first lens element, the second lens element, the third lens element, the fourth lens element, and the fifth lens element are made of plastic.

3. The optical image capturing lens system according to claim 1, wherein a curvature radius of the object-side surface of the fourth lens element is R7, a curvature radius of the image-side surface of the fourth lens element is R8, and they satisfy the following relation:

$-0.5 < (R7-R8)/(R7+R8) < -0.1$.

4. The optical image capturing lens system according to claim 1, wherein a vertical distance with respect to an optical axis between a non-axial critical point on the object-side surface of the fifth lens element and the optical axis is Yc51, the focal length of the optical image capturing lens system is f, and they satisfy the following relation:

$0.1 < Yc51/f < 0.7$.

5. The optical image capturing lens system according to claim 4, wherein the focal length of the optical image capturing lens system is f, the focal length of the fifth lens element is f5, and they satisfy the following relation:

$0.75 < f/f5 < 1.8$.

6. The optical image capturing lens system according to claim 4, wherein the curvature radius of the object-side surface of the fifth lens element is R9, the curvature radius of the object-side surface of the first lens element is R1, and they satisfy the following relation:

$0.2 < R9/R1 < 1.3$

7. The optical image capturing lens system according to claim 1, wherein the fifth lens element has a concave image-side surface.

8. The optical image capturing lens system according to claim 7, wherein a focal length of the fourth lens element is f4, a focal length of the second lens element is f2, and they satisfy the following relation:

$0.1 < f4/f2 < 0.85$.

9. The optical image capturing lens system according to claim 7, wherein a curvature radius of the object-side surface of the second lens element is R3, a curvature radius of the image-side surface of the second lens element is R4, and they satisfy the following relation:

$0.05 < (R3-R4)/(R3+R4) < 0.5$.

10. The optical image capturing lens system according to claim 7, wherein a central thickness of the second lens element is CT2, a central thickness of the fourth lens element is CT4, an axial distance between the second lens element and the third lens element is T23, an axial distance between the third lens element and the fourth lens element is T34, and they satisfy the following relation:

$0.5 < (CT2+CT4)/(T23+T34) < 0.9$.

11. The optical image capturing lens system according to claim 7, wherein an axial distance between the fourth lens element and the fifth lens element is T45, an axial distance between the third lens element and the fourth lens element is T34, and they satisfy the following relation:

$0 < T45/T34 < 0.35$.

12. The optical image capturing lens system according to claim 7, wherein an axial distance between the first lens element and the second lens element is T12, an axial distance between the second lens element and the third lens element is T23, and they satisfy the following relation:

$0.02 < T12/T23 < 0.4$.

13. The optical image capturing lens system according to claim 7, wherein a central thickness of the fourth lens element is CT4, a central thickness of the fifth lens element is CT5, and they satisfy the following relation:

$0.1 < CT4/CT5 < 0.40$.

* * * * *